United States Patent
Kanda et al.

(12) 
(10) Patent No.: US 10,294,386 B2
(45) Date of Patent: *May 21, 2019

(54) ACRYLIC-URETHANE COMPOSITE RESIN PARTICLES

(71) Applicant: KANSAI PAINT CO., LTD., Hyogo (JP)

(72) Inventors: Takashi Kanda, Kanagawa (JP); Masato Nakamizu, Kanagawa (JP)

(73) Assignee: KANSAI PAINT CO., LTD., Hyogo (JP)

(*) Notice: Subject to any disclaimer, the term of this patent is extended or adjusted under 35 U.S.C. 154(b) by 124 days.

This patent is subject to a terminal disclaimer.

(21) Appl. No.: 15/104,319

(22) PCT Filed: Dec. 12, 2014

(86) PCT No.: PCT/JP2014/082995
§ 371 (c)(1),
(2) Date: Jun. 14, 2016

(87) PCT Pub. No.: WO2015/098575
PCT Pub. Date: Jul. 2, 2015

(65) Prior Publication Data
US 2016/0326394 A1 Nov. 10, 2016

(30) Foreign Application Priority Data
Dec. 27, 2013 (JP) ................. 2013-270698

(51) Int. Cl.
| | | |
|---|---|---|
| *C08F 290/06* | (2006.01) | |
| *C08F 2/44* | (2006.01) | |
| *C09D 201/00* | (2006.01) | |
| *C09D 133/14* | (2006.01) | |
| *C09D 7/40* | (2018.01) | |
| *C08L 33/14* | (2006.01) | |
| *C09D 4/06* | (2006.01) | |
| *C08F 265/06* | (2006.01) | |
| *C08F 285/00* | (2006.01) | |
| *C08G 18/67* | (2006.01) | |
| *C08G 18/75* | (2006.01) | |
| *C09D 5/02* | (2006.01) | |
| *C08G 18/81* | (2006.01) | |
| *C09D 175/14* | (2006.01) | |
| *C09D 175/16* | (2006.01) | |
| *C08G 18/34* | (2006.01) | |
| *C08G 18/44* | (2006.01) | |
| *C08F 220/18* | (2006.01) | |
| *C08F 220/34* | (2006.01) | |

(52) U.S. Cl.
CPC .......... *C09D 133/14* (2013.01); *C08F 265/06* (2013.01); *C08F 285/00* (2013.01); *C08F 290/06* (2013.01); *C08G 18/348* (2013.01); *C08G 18/44* (2013.01); *C08G 18/671* (2013.01); *C08G 18/75* (2013.01); *C08G 18/8116* (2013.01); *C08L 33/14* (2013.01); *C09D 4/06* (2013.01); *C09D 5/022* (2013.01); *C09D 7/40* (2018.01); *C09D 175/14* (2013.01); *C09D 175/16* (2013.01); *C09D 201/00* (2013.01); *C08F 2220/1825* (2013.01); *C08F 2220/343* (2013.01)

(58) Field of Classification Search
CPC ...... C09D 133/14; C09D 7/40; C09D 175/00; C09D 4/06; C09D 7/12; C09D 201/00; C08F 265/06; C08F 285/00; C08F 290/06; C08F 2220/1825; C08F 2220/343; C08L 33/14
See application file for complete search history.

(56) References Cited

U.S. PATENT DOCUMENTS

| | | | |
|---|---|---|---|
| 5,068,262 A | 11/1991 | Noguchi | |
| 2007/0015851 A1 | 1/2007 | Akutagawa et al. | |

FOREIGN PATENT DOCUMENTS

| | | |
|---|---|---|
| CN | 1438257 | 8/2003 |
| CN | 1880374 | 12/2006 |
| JP | 2-103215 | 4/1990 |
| JP | 2005-120304 | 5/2005 |
| JP | 2011-149011 | 8/2011 |

(Continued)

OTHER PUBLICATIONS

Kanada, machine English translation of JP 2013-213151 (Oct. 2013).*

(Continued)

*Primary Examiner* — Jessica M Roswell

(74) *Attorney, Agent, or Firm* — Wenderoth, Lind & Ponack, L.L.P.

(57) ABSTRACT

Provided is an acrylic urethane composite resin particles comprising an acrylic urethane graft resin (I) and a graft acrylic resin (II), the acrylic urethane graft resin (I) being synthesized in the presence of the graft acrylic resin (II), the graft acrylic resin (II) being a hydrophobic-chain- and hydrophilic-chain-containing resin having a weight average molecular weight of 5000 or more, the acrylic urethane graft resin (I) comprising an acrylic resin component and a urethane resin component, the acrylic resin portion of the acrylic urethane graft resin (I) being synthesized using, as constituent monomer components, 0.1 to 30 mass % of a polymerizable unsaturated monomer (1) containing a group having active hydrogen atom(s) reactive with an isocyanate group and 70 to 99.9 mass % of other polymerizable unsaturated monomer(s) (2).

6 Claims, No Drawings

(56) References Cited

FOREIGN PATENT DOCUMENTS

| | | |
|---|---|---|
| JP | 2012-92224 | 5/2012 |
| JP | 2013-213151 | 10/2013 |
| JP | 2013-221041 | 10/2013 |
| WO | 2013/151050 | 10/2013 |

OTHER PUBLICATIONS

Extended European Search Report dated Jul. 6, 2017 in corresponding European Application No. 14874525.0.
Office Action dated Jul. 27, 2017 in corresponding Chinese Application No. 201480070646.5, with English translation.
International Search Report dated Mar. 10, 2015 in corresponding (PCT) Application No. PCT/JP2014/082995.

\* cited by examiner

ACRYLIC-URETHANE COMPOSITE RESIN PARTICLES

CROSS REFERENCE TO RELATED APPLICATIONS

This application claims priority to Japanese Patent Application No. 2013-270698, filed on Dec. 27, 2013, the entire contents of which are incorporated by reference herein.

TECHNICAL FIELD

The present invention relates to acrylic urethane composite resin particles having excellent dispersibility, storage stability, and compatibility, and to a method for producing the acrylic urethane composite resin particles.

BACKGROUND ART

Urethane resin particles, which have excellent physical properties, have been widely used as resin particles for use in coating compositions, for example, to improve coating film performance.

Acrylic urethane composite resin particles have also been used in the field of coating compositions and the like, for example, to obtain the synergistic effects of acryl and urethane, improve compatibility when applied to acrylic resin-based coating compositions, and reduce the cost of urethane resin particles.

Synthesis of acrylic urethane composite resin particles can, based on the manner of dispersion in aqueous systems, be roughly categorized into (i) self-emulsification-type particles and (ii) particles dispersed using an emulsifier.

As an example of the self-emulsification-type particles, Patent Literature 1 discloses a method for producing an aqueous dispersion of a urethane-acrylic inner particle mixture with excellent film-forming properties and water resistance, wherein seed polymerization of an acrylic monomer is performed using an aqueous dispersion of urethane, that can be prepared without using an emulsifier, as a seed, and seed polymerization of an acrylic monomer is then performed again using the obtained aqueous dispersion of an inner particle mixture of urethane and acryl as a seed.

However, in such self-emulsification-type particles, it is necessary to introduce water-dispersible groups such as acid groups into the urethane resin portion, using a substantial amount of a water-dispersibility-imparting-group-containing compound in order to impart water dispersibility. Dispersion in and/or conversion to aqueous systems is achieved by virtue of water-dispersibility-imparting groups introduced into the urethane resin component. Thus, there may be the following problems: for example, the degree of flexibility in the composition, molecular weight, etc., of the urethane resin component is limited, and the production thereof is not easy in terms of equipment and dispersion conditions.

As an example of the particles dispersed using an emulsifier, Patent Literature 2 discloses a method for producing an aqueous dispersion of a (meth)acrylic composite resin by sequentially or continuously adding, to an aqueous medium, starting-material emulsions in which one or more (meth)acrylic monomers are dispersed beforehand to perform emulsion polymerization of the one or more (meth)acrylic monomers in the presence of a urethane resin.

However, in such a method of dispersion using an emulsifier, high shear force is necessary, thus requiring a special apparatus such as a high-pressure emulsifying apparatus in manufacturing equipment, or reducing the resistance to water load (e.g., water resistance and the like) of the obtained coating film when the particles are used for coating compositions because a substantial amount of an emulsifier is used. In addition, there is another problem such that the degree of flexibility in the composition (such as SP value) of the acrylic resin portion is limited.

CITATION LIST

Patent Literature

PTL 1: 2005-120304A
PTL 2: 2011-149011A

SUMMARY OF INVENTION

Technical Problem

An object of the present invention is to provide acrylic urethane composite resin particles having a high degree of flexibility in setting the compositions, molecular weights, etc., of the acrylic resin portion and the urethane resin portion, and exhibiting excellent dispersibility, storage stability, and compatibility; and to provide a method for producing the acrylic urethane composite resin particles.

Solution to Problem

The present inventors conducted extensive research to achieve the above object, and found that it is achieved when acrylic urethane composite resin particles are obtained by synthesizing an acrylic urethane graft resin in which an acrylic resin component and a urethane resin component are grafted together, (i) the acrylic urethane graft resin being synthesized in the presence of a hydrophobic-chain- and hydrophilic-chain-containing graft acrylic resin having a weight average molecular weight of 5000 or more used as a dispersion stabilizer; and (ii) the acrylic resin component being synthesized using, as a constituent monomer component, a polymerizable unsaturated monomer containing active hydrogen atom(s) reactive with an isocyanate group. The present invention has been accomplished based on this finding.

Specifically, the present invention includes the following:
Item 1. Acrylic urethane composite resin particles described below:
the acrylic urethane composite resin particles comprising an acrylic urethane graft resin (I) and a graft acrylic resin (II), the acrylic urethane graft resin (I) being synthesized in the presence of the graft acrylic resin (II), the graft acrylic resin (II) being a hydrophobic-chain- and hydrophilic-chain-containing resin having a weight average molecular weight of 5000 or more, the acrylic urethane graft resin (I) comprising an acrylic resin component and a urethane resin component, and
the acrylic resin portion of the acrylic urethane graft resin (I) being synthesized using, as constituent monomer components, 0.1 to 30 mass % of a polymerizable unsaturated monomer (1) containing a group having active hydrogen atom(s) reactive with an isocyanate group and 70 to 99.9 mass % of other polymerizable unsaturated monomer(s) (2).
Item 2. A coating composition comprising the acrylic urethane composite resin particles according to Item 1.
Item 3. The coating composition according to Item 2, which comprises a film-forming resin component.

Item 4. A method for producing acrylic urethane composite resin particles comprising an acrylic urethane graft resin (I) and a graft acrylic resin (II), the method comprising the following step:
synthesizing the acrylic urethane graft resin (I) in the presence of the graft acrylic resin in an aqueous medium, the graft acrylic resin being a hydrophobic-chain- and hydrophilic-chain-containing resin having a weight average molecular weight of 5000 or more,
the acrylic resin of the acrylic urethane graft resin (I) being synthesized using, as constituent monomer components, 0.1 to 30 mass % of a polymerizable unsaturated monomer (1) containing a group having active hydrogen atom(s) reactive with an isocyanate group and 70 to 99.9 mass % of other polymerizable unsaturated monomer(s) (2).

Advantageous Effects of Invention

The acrylic urethane composite resin particles of the present invention are mainly characterized in that the acrylic urethane composite resin particles are produced using a hydrophobic-chain- and hydrophilic-chain-containing graft acrylic resin as a dispersion stabilizer, and have a form in which an acrylic urethane graft resin is dispersed in an aqueous medium.

The acrylic urethane graft resin is dispersed in an aqueous medium in a highly stable manner by the effect of the graft acrylic resin used as a dispersion stabilizer. Thus, the acrylic urethane composite resin particles of the present invention have extremely excellent dispersion stability and storage stability compared with those of conventional acrylic urethane composite resin particles.

Regarding the acrylic resin of the composite resin particles, the acrylic resin portion of the acrylic urethane graft resin and the graft acrylic resin, which is a dispersion stabilizer, are separated, thus enabling division of functions. This expands the choices of the composition, molecular weight, etc., of all of the composite resin particles, including not only those of the acrylic resin portion, but also those of the urethane resin portion, compared with conventional acrylic urethane composite resin particles; therefore, there is an advantage such that acrylic urethane composite resin particles with a very high degree of flexibility in designing can be obtained.

The present invention further makes it possible to obtain a coating composition with high compatibility with resins such as other acrylic resins, high washability (solubility in a wash solvent), excellent storage stability, and excellent coating film performance of the obtained coating film such as finish appearance and water resistance, compared with conventional acrylic urethane composite resin particles.

DESCRIPTION OF EMBODIMENTS

The acrylic urethane composite resin particles and coating composition of the present invention are described in more detail below.

The acrylic urethane composite resin particles of the present invention (hereinafter sometimes simply referred to as "the resin particles of the invention") are acrylic urethane composite resin particles comprising an acrylic urethane graft resin (I) and a graft acrylic resin (II),
the acrylic urethane graft resin (I) being synthesized in the presence of the graft acrylic resin (II), the graft acrylic resin (II) being a hydrophobic-chain- and hydrophilic-chain-containing resin having a weight average molecular weight of 5000 or more, the acrylic urethane graft resin (I) comprising an acrylic resin component and a urethane resin component, the acrylic resin component of the acrylic urethane graft resin (I) being synthesized using, as constituent monomer components, 0.1 to 30 mass % of a polymerizable unsaturated monomer (1) containing a group having active hydrogen atom(s) reactive with an isocyanate group and 70 to 99.9 mass % of other polymerizable unsaturated monomer(s) (2).

Acrylic Urethane Composite Resin Particles

The acrylic urethane composite resin particles of the present invention mainly comprise an acrylic urethane graft resin (I), which is a main portion, and a graft acrylic resin (II), which is a dispersion stabilizer.

The form of the acrylic urethane composite resin particles is not particularly limited as long as they are dispersed in water. For example, it is preferable that the acrylic urethane composite resin particles be dispersed in water as particles having a structure in which the graft acrylic resin (II), which is a dispersion stabilizer, is positioned around the acrylic urethane graft resin (I). In other words, preferably, the acrylic urethane composite resin particles are dispersed in water as micelles having a core shell structure in which the graft acrylic resin (II) is present outside and the acrylic urethane graft resin (I) is present inside. The acrylic urethane composite resin particles of the present invention are believed to almost have such a particle form.

More specifically, the core shell structure refers to a structure in which components having different resin compositions are present in the same micelle and in which the resin composition of the central portion (core) differs from that of the outer shell portion (shell).

The core/shell type multilayer structure generally takes a layered structure such that the core portion is completely covered by the shell portion. However, depending on the mass ratio of the core portion to the shell portion or other conditions, the shell portion may be insufficient for forming a layered structure. In that case, a complete layered structure as described above is not necessary. A structure in which the shell portion partially covers the core portion may be selected.

The acrylic urethane graft resin (I) and the graft acrylic resin (II) are preferably present in the acrylic urethane composite resin particles at an acrylic urethane graft resin (I):graft acrylic resin (II) ratio ranging from 20:80 to 95:5 (mass ratio), more preferably from 40:60 to 90:10, and even more preferably from 60:40 to 80:20.

Less than 20 mass % of the acrylic urethane graft resin (I) in the composite resin particles may result in reduced properties of the urethane resin since the proportion of the urethane resin is small. More than 95 mass % of the acrylic urethane graft resin (I) may result in reduced dispersibility of the composite resin particles since the amount of the dispersion stabilizer is small.

Acrylic Urethane Graft Resin (I)

The acrylic urethane graft resin (I) mainly comprises an acrylic resin component and a urethane resin component. The acrylic urethane graft resin (I) primarily refers to an acrylic urethane resin in which an acrylic resin component and a urethane resin component are chemically bonded to each other. The acrylic urethane graft resin can also be referred to as a copolymer of acrylic resin and urethane resin. In addition, the "acrylic resin component" and the "urethane resin component" can also be referred to as the "acrylic resin portion" and the "urethane resin portion," respectively, since each of the components constitutes a portion of the acrylic urethane graft resin (I).

Acrylic Resin Component

The acrylic resin component of the acrylic urethane graft resin (I) is synthesized by polymerizing, as constituent monomer components, a polymerizable unsaturated monomer (1) containing a group having active hydrogen atom(s) reactive with an isocyanate group and other polymerizable unsaturated monomer(s) (2).

As used herein, "polymerizable unsaturated monomer" primarily refers to a polymerizable-unsaturated-group-containing compound. A polymerizable unsaturated group means an unsaturated group that can undergo radical polymerization. Specific examples of such polymerizable unsaturated groups include acryloyl groups, methacryloyl groups, vinyl groups, allyl groups, propenyl groups, isopropenyl groups, maleimide groups, vinyl ether groups, and the like. Of these polymerizable unsaturated groups, acryloyl groups and methacryloyl groups are preferable, and acryloyl groups are particularly preferable, in view of excellent reactivity.

In the polymerizable unsaturated monomer (1) containing a group having active hydrogen atom(s) reactive with an isocyanate group, the group having active hydrogen atom(s) reactive with an isocyanate group serves as a group for a grafting reaction between the acrylic resin component and urethane resin component of the acrylic urethane graft resin (I). The polymerizable unsaturated monomer (1) containing a group having active hydrogen atom(s) reactive with an isocyanate group encompasses one in which active hydrogen atom(s) reactive with an isocyanate group are reacted with the isocyanate groups of the urethane resin portion before synthesis of the acrylic resin portion.

A group having active hydrogen atom(s) reactive with an isocyanate group that does not undergo a grafting reaction with the acrylic resin component can be used as a crosslinking reactive group in applications such as coating compositions.

Examples of the group having active hydrogen atom(s) reactive with an isocyanate group include hydroxy, amino, carboxy, and the like.

Examples of the polymerizable unsaturated monomer (1) containing a group having active hydrogen atom(s) reactive with an isocyanate group include hydroxy-containing polymerizable unsaturated monomers, amino-containing polymerizable unsaturated monomers, carboxy-containing polymerizable unsaturated monomers, and the like.

The polymerizable unsaturated monomer (1) is preferably a hydroxy-containing polymerizable unsaturated monomer in view of ease of reaction control.

Examples of hydroxy-containing polymerizable unsaturated monomers include monoesterified products of (meth)acrylic acid with a dihydric alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate; ε-caprolactone-modified products of the monoesterified products of (meth)acrylic acid with a dihydric alcohol having 2 to 8 carbon atoms; N-hydroxymethyl (meth)acrylamide; allyl alcohol; (meth)acrylates having hydroxy-terminated polyoxyethylene chains; and the like.

Examples of amino-containing polymerizable unsaturated monomers include 1-aminoethyl (meth)acrylate, 1-aminopropyl (meth)acrylate, allylamine, p-vinylaniline, and the like.

These monomers can be used singly, or in a combination of two or more.

Particularly preferred as the hydroxy-containing polymerizable unsaturated monomer are 2-hydroxyethyl (meth)acrylate, 2-hydroxypropyl (meth)acrylate, 3-hydroxypropyl (meth)acrylate, and 4-hydroxybutyl (meth)acrylate.

Particularly preferred as the amino-containing polymerizable unsaturated monomer are 1-aminoethyl (meth)acrylate and 1-aminopropyl (meth)acrylate.

In view of stability of the acrylic urethane composite resin particles in an aqueous medium and imparting a crosslinkable functional group, the proportion of the polymerizable unsaturated monomer (1) used is 0.1 to 30 mass %, preferably 1 to 25 mass %, and even more preferably 5 to 20 mass %, based on the total amount of the constituent monomer components of the acrylic resin component.

Examples of other polymerizable unsaturated monomer(s) (2) include alkyl or cycloalkyl (meth)acrylates, such as methyl (meth)acrylate, ethyl (meth)acrylate, n-propyl (meth)acrylate, iso-propyl (meth)acrylate, n-butyl (meth)acrylate, iso-butyl (meth)acrylate, Cert-butyl (meth)acrylate, pentyl (meth)acrylate, hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, isobornyl (meth)acrylate, adamanthyl (meth)acrylate, and tricyclodecanyl (meth)acrylate; polymerizable unsaturated monomers having at least two polymerizable unsaturated groups per molecule, such as allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylol propane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl terephthalate, divinylbenzene, methylenebisacrylamide, and ethylenebisacrylamide;

aromatic ring-containing polymerizable unsaturated monomers, such as benzyl (meth)acrylate, styrene, α-methylstyrene, and vinyltoluene; alkoxysilyl-containing polymerizable unsaturated monomers, such as vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane; perfluoroalkyl (meth)acrylates, such as perfluorobutylethyl (meth)acrylate and perfluorooctylethyl (meth)acrylate; fluorinated alkyl-containing polymerizable unsaturated monomers, such as fluoroolefin; polymerizable unsaturated monomers having photopolymerizable functional groups, such as maleimide; vinyl compounds, such as N-vinylpyrrolidone, ethylene, butadiene, chloroprene, vinyl propionate, and vinyl acetate; carboxy-containing polymerizable unsaturated monomers, such as (meth)acrylic acid, maleic acid, crotonic acid, and β-carboxyethyl acrylate; nitrogen-containing polymerizable unsaturated monomers, such as (meth)acrylonitrile, (meth)acrylamide, N,N-dimethylaminoethyl (meth)acrylate, diethylaminoethyl (meth)acrylate, N,N-dimethylaminopropyl (meth)acrylamide, and adducts of glycidyl (meth)acrylate with amines; epoxy-containing polymerizable unsaturated monomers, such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, and allyl glycidyl ether; (meth)acrylates having alkoxy-terminated polyoxyethylene chains; carbonyl-containing polymerizable unsaturated monomers, such as acrolein, diacetone acrylamide, diacetone methacrylamide, acetoacetoxyethyl methacrylate, formylstyrol, and vinyl alkyl ketones having 4 to 7 carbon atoms (e.g., vinyl methyl ketone, vinyl ethyl ketone, and vinyl butyl ketone); and the like.

Preferable among the alkyl or cycloalkyl (meth)acrylates are n-butyl (meth)acrylate and 2-ethylhexyl (meth)acrylate.

Preferable among the polymerizable unsaturated monomers having at least two polymerizable unsaturated groups per molecule are allyl (meth)acrylate, ethylene glycol di(meth)acrylate, 1,4-butanediol di(meth)acrylate, neopentyl glycol di(meth)acrylate, and 1,6-hexanediol di(meth)acrylate.

In the present specification, the term "(meth)acrylic acid" means acrylic acid or methacrylic acid. The term "(meth)acrylate" means acrylate or methacrylate. The term "(meth)acrylamide" means acrylamide or methacrylamide.

These monomers can be used singly, or in a combination of two or more.

The proportion of the polymerizable unsaturated monomer(s) (2) used is 70 to 99.9 mass %, preferably 75 to 99 mass %, and even more preferably 80 to 95 mass %, based on the total amount of the constituent monomer components of the acrylic resin component.

The polymerization reaction of polymerizable unsaturated groups for the acrylic resin component can be performed by a known radical polymerization reaction. The polymerization initiator may be a water-soluble initiator or an oil-soluble initiator. When an oil-soluble initiator is used under aqueous conditions, the oil-soluble initiator is preferably added before forming an aqueous dispersion.

Although the appropriate amount of the polymerization initiator varies depending on the type of the polymerization initiator, it is generally preferably that the polymerization initiator be used within the range of 0.05 to 5 mass %, based on the total amount of the polymerizable unsaturated monomers.

Examples of polymerization initiators include azo compounds, such as azobisisobutyronitrile, azobis(2,4-dimethylvaleronitrile), azobis(2-methylpropionenitrile), azobis(2-methylbutyronitrile), 4,4'-azobis(4-cyanobutanoic acid), dimethyl azobis(2-methylpropionate), azobis[2-methyl-N-(2-hydroxyethyl)-propionamide], azobis(2-methyl-N-[2-(1-hydroxybutyl)]-propionamide), and 2,2'-azobis[N-(2-carboxyethyl)-2-methylpropionamide]; organic peroxides, such as benzoyl peroxide, octanoyl peroxide, lauroyl peroxide, stearoyl peroxide, cumene hydroperoxide, tert-butyl peroxide, Cert-butylperoxy laurate, tert-butylperoxy isopropyl carbonate, tert-butylperoxy acetate, and diisopropylbenzene hydroperoxide; and inorganic peroxides, such as potassium persulfate, ammonium persulfate, sodium persulfate, and like persulfates.

These polymerization initiators can be used singly, or in a combination of two or more.

An organic or inorganic peroxide can be used in combination with a reducing agent in the form of a redox initiator. Examples of reducing agents include L-ascorbic acid, L-sorbic acid, sodium metabisulfite, ferric sulfate, ferric chloride, rongalite, and the like.

The polymerization can be performed at a temperature of about 20 to 100° C. When a redox initiator is used in a redox system, the polymerization can be performed at a temperature of about 75° C. or less.

The method for adding the polymerization initiator is not particularly limited, and can be suitably selected according to the type and amount of the polymerization initiator. For example, the polymerization initiator may be incorporated beforehand into the monomer mixture or aqueous medium, or added at one time or dropwise at the time of polymerization. Any of the following methods can be used: a method of adding the initiator at one time at the beginning of the polymerization, a method of adding the initiator dropwise over time, or a method comprising incorporating a part of the initiator at the beginning of the polymerization, and then adding the rest of the initiator.

In view of sufficiently performing the polymerization reaction and reducing the residual monomers, it is also possible to add a polymerization initiator during the polymerization reaction or after the polymerization, and further conduct a polymerization reaction. In this case, any combination of polymerization initiators can be selected.

Generally, the amount of the polymerization initiator added is preferably about 0.1 to 5 mass %, and more preferably about 0.2 to 3 mass %, based on the total mass of the monomers used.

In the polymerization of the polymerizable unsaturated monomers, a known chain transfer agent can be used to adjust the molecular weight. Examples of chain transfer agents include mercapto-containing compounds. Specific examples thereof include lauryl mercaptan, t-dodecyl mercaptan, octylmercaptan, 2-ethylhexyl thioglycolate, 2-methyl-5-tert-butylthiophenol, mercaptoethanol, thioglycerol, mercaptoacetic acid (thioglycolic acid), mercaptopropionate, n-octyl-3-mercaptopropionate, and the like.

When the chain transfer agent is used, it is generally preferable that the amount of the chain transfer agent be in the range of 0.05 to 10 mass %, particularly preferably 0.1 to 5 mass %, based on the total amount of the polymerizable unsaturated monomers used.

The polymerization reaction is generally performed for about 1 to 12 hours.

In view of the performance of the coating film obtained when the composite resin particles are used for a coating composition, the acrylic resin component of the acrylic urethane graft resin (I) preferably has a hydroxy value of 1 to 150 mg KOH/g, more preferably 2 to 120 mg KOH/g, and even more preferably 5 to 100 mg KOH/g.

Moreover, in view of polymerization stability, the acrylic resin component of the acrylic urethane graft resin (I) preferably has an acid value of substantially 0.

Further, in view of the performance of the coating film obtained when the composite resin particles are used for a coating composition, the acrylic resin component of the acrylic urethane graft resin (I) preferably has a glass transition temperature of −60 to 60° C., particularly preferably −60 to 40° C., and further preferably −60 to 20° C.

In the present specification, the glass transition temperature Tg (absolute temperature) refers to a value calculated according to the following equation.

$$1/Tg = W_1/T_1 + W_2/T_2 + \ldots W_n/T_n$$

(wherein $W_1, W_2 \ldots W_n$ are mass fractions of the respective monomers; and $T_1, T_2 \ldots T_n$ are glass transition temperatures (absolute temperatures) of homopolymers of the respective monomers)

The glass transition temperatures of homopolymers of the respective monomers are values shown in the "Polymer Handbook" Fourth Edition, edited by J. Brandrup, E. H. Immergut, and E. A. Grulke, 1999. When the glass transition temperature of a monomer was not shown in the Handbook, a homopolymer of the monomer having a weight average molecular weight of around 50,000 was synthesized, and the glass transition temperature of the homopolymer was determined by differential scanning thermal analysis.

Urethane Resin Component

The urethane resin component of the acrylic urethane graft resin (I) can be synthesized, for example, by using an organic polyisocyanate compound and a polyol; and, optionally, a compound containing both an active hydrogen group and an ion-forming group.

Examples of the organic polyisocyanate compound include isophorone diisocyanate (IPDI), 2,4-tolylene diisocyanate (2,4-TDI) and a mixture thereof with 2,6-tolylene diisocyanate (2,6-TDI), 4 4'-diphenylmethane diisocyanate, 1,4-phenylene diisocyanate, 1,5-naphthalene diisocyanate, hexamethylene diisocyanate (HMDI), trimethylhexamethylene diisocyanate, cyclohexane-1,4-diisocyanate, 4,4'-dicyclohexylmethane diisocyanate (hydrogenated MDI), xylylene diisocyanate, tetramethylxylylene diisocyanate, and the like. If necessary, trimers of the above-mentioned TDI, HMDI, IPDI, etc., or trivalent polyisocyanates that are reactants with trimethylolpropane or the like can also be used.

Examples of the polyol include the following compounds. Diol compounds: ethylene glycol, propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexane glycol, 2,5-hexanediol, dipropylene glycol, 2,2,4-trimethyl-1,3-pentanediol, tricyclodecanedimethanol, 1,4-cyclohexanedimethanol, and the like.

Polyetherdiols: alkylene oxide addition products of the diol compound described above, ring-opening (co)polymers of alkylene oxides and cyclic ethers (tetrahydrofuran and the like), such as polyethylene glycol, polypropylene glycol, (blocked or random) copolymers of ethylene glycol and propylene glycol, glycol, polytetramethylene glycol, polyhexamethylene glycol, polyoctamethylene glycol, and the like.

Polyester diols: compounds obtained by polycondensing dicarboxylic acids (or dicarboxylic acid anhydrides), such as adipic acid, succinic acid, sebacic acid, glutaric acid, maleic acid, fumaric acid, and phthalic acid, with diol compounds described above, such as ethylene glycol, propylene glycol, 1,4-butanediol, 1,6-hexanediol, 1,8-octamethylenediol, and neopentyl glycol, under conditions such that hydroxy groups are present in excess. Specific examples thereof include ethylene glycol-adipic acid condensation products, butanediol-adipic acid condensation products, hexamethylene glycol-adipic acid condensation products, ethylene glycol-propylene glycol-adipic acid condensation products, polylactonediols obtained by subjecting lactone to ring-opening polymerization using glycol as an initiator, and the like.

Polyether ester diols: compounds obtained by adding ether group-containing diols (e.g., the above-mentioned polyether diol and diethylene glycol), or mixtures thereof with other glycols to dicarboxylic acids (or dicarboxylic acid anhydrides) as described above as examples of polyester diols and then reacting alkylene oxides therewith, such as polytetramethylene glycol-adipic acid condensation products.

Polycarbonate diols: compounds represented by the formula HO—R—(O—C(O)—O—R)$_x$—OH (wherein R represents a $C_{1-12}$ saturated fatty acid diol residue, and x represents the number of repetitive units in the molecule and is usually an integer of 5 to 50), and the like. These compounds can be obtained, for example, by a transesterification method in which a saturated aliphatic diol is reacted with a substituted carbonate (diethyl carbonate, diphenyl carbonate, etc.) under conditions such that hydroxy groups are present in excess, and a method in which the saturated aliphatic diol described above is reacted with a phosgene, or the reaction product is then further reacted, if necessary, with the saturated aliphatic diol.

In view of, for example, the performance of the coating film obtained when the composite resin particles are used for a coating composition, it is preferable to mainly use a polyol component containing a polycarbonate diol as the polyol component.

In view of water dispersibility etc., the polyol preferably has a number average molecular weight of 300 to 3000, and more preferably 500 to 2500.

Examples of the compound containing both an active hydrogen group and an ion-forming group include compounds containing at least two hydroxy groups and at least one carboxy group per molecule, compounds containing at least two hydroxy groups and at least one sulfonic acid group per molecule, and the like. This compound acts as an ion-forming group in the urethane resin. To improve the dispersion stability of the acrylic urethane composite resin particles, this compound can be suitably used.

Examples of carboxy-containing compounds include alkanol carboxylic acids, such as dimethylol propionic acid, dimethylol acetic acid, dimethylol butanoic acid, dimethylol heptanoic acid, dimethylolnonanoic acid, 1-carboxy-1,5-pentylenediamine, dihydroxybenzoic acid, and 3,5-diaminobenzoic acid; half-ester compounds of polyoxypropylene triol with maleic anhydride or phthalic anhydride; and the like.

Examples of sulfonic acid group-containing compounds include 2-sulfonic acid-1,4-butanediol, 5-sulfonic hydroxyethyl isophthalate, N,N-bis(2-hydroxyethyl)aminoethylsulfonic acid, and the like.

When the compound containing both an active hydrogen group and an ion-forming group is used, the amount of the compound containing both an active hydrogen group and an ion-forming group is preferably 0 to 20 mass %, and more preferably 5 to 10 mass %, based on the total amount of the compounds constituting the urethane resin component.

When a carboxy- or sulfonic-acid-group-containing compound is used as the compound containing both an active hydrogen group and an ion-forming group, a neutralizer can be used to form a salt and hydrophilize the compound. Examples of the neutralizer include amines, such as trimethylamine, triethylamine, monoethanolamine, diethanolamine, triethanolamine, triethylenediamine, and dimethylaminoethanol; and alkali metal compounds, such as sodium hydroxide and potassium hydroxide.

The percent neutralization of carboxy or sulfonic acid groups can generally be 50 to 100 mol %. The neutralizer is preferably dimethylaminoethanol in view of dispersibility.

The grafting reaction between the acrylic resin component and urethane resin component in the acrylic urethane graft resin (I) is conducted by reacting the group having active hydrogen atom(s) reactive with an isocyanate group of the polymerizable unsaturated monomer (1), which is a component of the acrylic resin component, as a grafting reaction group; therefore, the urethane resin component is synthesized under conditions in which isocyanate groups are present in excess so that isocyanate groups remain.

The molar ratio of NCO groups of the organic polyisocyanate compound to active hydrogen groups of the polyol and the compound containing both an active hydrogen group and an ion-forming group is preferably within the range of 1.01:1 to 3.0:1, and particularly preferably 1.05:1 to 2.0:1.0.

The urethane resin component can be synthesized by reacting the organic polyisocyanate compound and the polyol, and, optionally, the compound containing both an active hydrogen group and an ion-forming group to obtain an isocyanate group-terminated urethane prepolymer; and if necessary, further performing a chain extension reaction.

The prepolymerization reaction is preferably performed at 50 to 120° C. When the prepolymerization reaction is performed in the presence of a polymerizable unsaturated monomer of the acrylic resin component, a polymerization inhibitor, such as p-methoxy phenol, butylhydroxytoluene, and 4-tert-butylcatechol, is preferably added at a concentration of about 20 to 3000 ppm to the polymerizable unsaturated monomer in the presence of air, to prevent polymerization of the polymerizable unsaturated monomer due to heat.

As a catalyst for the urethanization reaction, an organic tin compound, such as dibutyltin dilaurate, dibutyltin dioctoate, or stannous octoate, or a tertiary amine compound, such as triethylamine or triethylenediamine, can be used as desired.

The grafting reaction between the acrylic resin component and urethane resin component of the acrylic urethane graft resin (I) can be performed by a known method without limitation. In view of the stability of polymerization reaction, the grafting reaction is preferably performed by reacting the group having active hydrogen atom(s) reactive with an isocyanate group of the polymerizable unsaturated monomer (1) with the isocyanate groups of the urethane resin component to introduce the polymerizable unsaturated groups into the urethane resin component, and reacting the urethane resin component in which the polymerizable unsaturated groups are introduced with the polymerizable unsaturated monomer(s) (2) to conduct a polymerization reaction of the polymerizable unsaturated groups and complete the reaction.

The polymerization reaction is generally performed for about 1 to 12 hours.

In the acrylic urethane graft resin (I), if necessary, a portion or all of the isocyanate groups of the urethane resin component (urethane prepolymer) may be blocked with a blocking agent to yield blocked isocyanate groups.

A blocking agent is used for blocking free isocyanate groups. When blocked polyisocyanate groups are heated at, for example, a temperature of 100° C. or higher, and preferably 130° C. or higher, isocyanate groups are regenerated and can readily react with functional groups, such as hydroxy groups.

Examples of the blocking agent include phenol, cresol, xylenol, nitrophenol, ethylphenol, hydroxydiphenyl, butylphenol, isopropylphenol, nonylphenol, octylphenol, methyl hydroxybenzoate, and like phenol compounds; ε-caprolactam, δ-valerolactam, γ-butyrolactam, β-propiolactam, and like lactam compounds; methanol, ethanol, propyl alcohol, butyl alcohol, amyl alcohol, lauryl alcohol, and like aliphatic alcohol compounds; ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, and like ether compounds; benzyl alcohol; glycolic acid; methyl glycolate, ethyl glycolate, butyl glycolate, and like glycolates; lactic acid, methyl lactate, ethyl lactate, butyl lactate, and like lactates; methylol urea, methylol melamine, diacetone alcohol, 2-hydroxyethyl acrylate, 2-hydroxyethyl methacrylate, and like alcohol compounds; formamide oxime, acetamide oxime, acetoxime, methyl ethyl ketoxime, diacetyl monoxime, benzophenone oxime, cyclohexane oxime, and like oxime compounds; dimethyl malonate, diethyl malonate, ethyl acetoacetate, methyl acetoacetate, acetylacetone, and like active methylene compounds; butyl mercaptan, t-butyl mercaptan, hexyl mercaptan, t-dodecyl mercaptan, 2-mercaptobenzothiazole, thiophenol, methylthiophenol, ethylthiophenol, and like mercaptan compounds; acetanilide, acetanisidide, acetotoluide, acrylamide, methacrylamide, acetic acid amide, stearic acid amide, benzamide and like acid amide compounds; succinimide, phthalimide, maleimide, and like imide compounds; diphenylamine, phenylnaphthylamine, xylidine, N-phenylxylidine, carbazole, aniline, naphthylamine, butylamine, dibutylamine, butylphenylamine, and like amines; imidazole, 2-ethylimidazole, and like imidazole compounds; 3,5-dimethylpyrazole and like pyrazole compounds; urea, thiourea, ethylene urea, ethylenethiourea, diphenylurea, and like urea compounds; phenyl N-phenylcarbamate and like carbamate compounds; ethyleneimine, propyleneimine, and like imine compounds; and sodium bisulfite, potassium bisulfite, and like sulfite compounds.

Preferred among these are oxime, lactam and pyrazole blocking agents. In view of imparting low-temperature curability, pyrazole blocking agents are particularly preferable.

In view of dispersibility, manufacturability, and the performance of the coating film obtained when the composite resin particles are used for a coating composition, the urethane resin component of the acrylic urethane graft resin (I) preferably has a weight average molecular weight of 3000 to 100000, and particularly preferably 5000 to 50000.

If the weight average molecular weight is less than 3000, the performance of the coating film obtained when the composite resin particles are used for a coating composition may be low. If the weight average molecular weight exceeds 100000, dispersibility may be reduced, and/or the viscosity may significantly increase during the production, requiring a large amount of an organic solvent.

Graft Acrylic Resin (II)

The graft acrylic resin (II) is a dispersion stabilizer in the acrylic urethane composite resin particles, and is a graft acrylic resin that has a structure in which a hydrophobic chain component (A) and a hydrophilic chain component (B) are grafted together. The "hydrophobic chain component (A)" and "hydrophilic chain component (B)" are also referred to as "hydrophobic portion (A)" and "hydrophilic portion (B)," since each of the components constitutes a portion of the graft acrylic resin (II).

The graft acrylic resin (II) can be synthesized by polymerizing polymerizable unsaturated monomer components having different compositions (the hydrophobic chain component (A) and the hydrophilic chain component (B)) in the presence of an organic solvent in multiple stages.

Of these, the hydrophilic chain component (B) is synthesized using a hydrophilic group-containing polymerizable unsaturated monomer as an essential component.

The grafting reaction of the hydrophobic chain component (A) with the hydrophilic chain component (B) can be performed, for example, by incorporating polymerizable unsaturated monomers having functional groups, other than polymerizable unsaturated groups, that are reactive with each other into the component (A) and the component (B), and allowing the functional groups that are reactive with each other to be reacted with each other.

Examples of combinations of such functional groups that are reactive with each other include a combination of epoxy and carboxy, a combination of hydroxy and isocyanate, condensation of alkoxysilyl groups, and the like.

Among these, a combination of epoxy and carboxy can preferably be used in view of ease of synthesis.

The reaction between the functional groups that are reactive with each other can be performed by suitably setting reaction conditions according to the combination of the functional groups etc.

A graft acrylic resin (II) synthesized using the hydrophobic chain component (A) into which an epoxy-containing polymerizable unsaturated monomer is incorporated and the hydrophilic chain component (B) into which a carboxy-containing polymerizable unsaturated monomer is incorporated (hereinafter this graft acrylic resin is also referred to as the "graft acrylic resin (II-p)") can particularly preferably be used.

In view of the dispersibility of the acrylic urethane composite resin particles, the difference in solubility parameter between the hydrophobic chain component (A) and hydrophilic chain component (B) of the graft acrylic resin (II) is preferably at least 0.5 or more, and more preferably 1.0 or more.

$$\text{(Molecular cohesive energy/molecular volume)}^{1/2} \quad \text{equation (1)}$$

The SP value of each of the hydrophobic chain component (A) and the hydrophilic chain component (B) can be determined. For example, when each of the hydrophobic chain component (A) and the hydrophilic chain component (B) is a copolymer that can be synthesized by polymerizing two or more polymerizable unsaturated monomers as constituent monomer components, each SP value can be determined by the following equation (2).

$$S1 \times \Phi1 + S2 \times \Phi2 \quad \text{equation (2)}$$

(wherein S1, S2 . . . indicate the solubility parameters of the respective monomers used in the copolymer, and $\Phi1$, $\Phi2$ . . . indicate the volume fractions of the respective monomers of the copolymer)

Graft Acrylic Resin (II-p)

The graft acrylic resin (II-p) can be obtained by synthesizing an acrylic resin in which a hydrophobic chain component (A) and a hydrophilic chain component (B) are grafted together. The hydrophobic chain component (A) can be synthesized by polymerizing an epoxy-containing polymerizable unsaturated monomer (a1) and other polymerizable unsaturated monomer(s) (a2) as constituent monomer components, and the hydrophilic chain component (B) can be synthesized by polymerizing a carboxy-containing polymerizable unsaturated monomer (b1) and other polymerizable unsaturated monomer(s) (b2) as constituent monomer components.

Hydrophobic Chain Component (A)

In the hydrophobic chain component (A), the epoxy-containing polymerizable unsaturated monomer (a1) is a monomer used for reacting with the carboxy of the carboxy-containing polymerizable unsaturated monomer, which is a constituent monomer of the hydrophilic chain component (B), to graft together the hydrophobic chain component (A) and the hydrophilic chain component (B). Examples thereof include glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, and the like.

These monomers can be used singly, or in a combination of two or more.

Other polymerizable unsaturated monomer(s) (a2) are polymerizable unsaturated monomers other than the monomer (a1) described above. Examples thereof include alkyl or cycloalkyl (meth)acrylates, such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, Isostearyl Acrylate (trade name, produced by Osaka Organic Chemical Industry, Ltd.), cyclohexyl (meth)acrylate, methylcyclohexyl (meth)acrylate, t-butylcyclohexyl (meth)acrylate, cyclododecyl (meth)acrylate, and tricyclodecanyl (meth)acrylate; isobornyl-containing polymerizable unsaturated monomers, such as isobornyl (meth)acrylate; adamantyl-containing polymerizable unsaturated monomers, such as adamanthyl (meth)acrylate; tricyclodecenyl-containing polymerizable unsaturated monomers, such as tricyclodecenyl (meth)acrylate; aromatic ring-containing polymerizable unsaturated monomers, such as benzyl (meth)acrylate, styrene, α-methylstyrene, and vinyltoluene; hydrolyzable silyl-containing polymerizable unsaturated monomers, such as vinyltrimethoxysilane, vinylmethyldimethoxysilane, vinyltriethoxysilane, vinylmethyldiethoxysilane, vinyltris(2-methoxyethoxy)silane, vinyltriisopropoxysilane, γ-(meth)acryloyloxypropyltrimethoxysilane, γ-(meth)acryloyloxypropylmethyldimethoxysilane, γ-(meth)acryloyloxypropyltriethoxysilane, γ-(meth)acryloyloxypropylmethyldiethoxysilane, γ-(meth)acryloyloxypropyltri-n-propoxysilane, γ-(meth)acryloyloxypropyltriisopropoxysilane, vinyltriacetoxysilane, and β-(meth)acryloyloxyethyltrimethoxysilane; perfluoroalkyl (meth)acrylates, such as perfluorobutylethyl (meth)acrylate and perfluorooctylethyl (meth)acrylate; fluorinated alkyl-containing polymerizable unsaturated monomers, such as fluoroolefin; vinyl compounds, such as N-vinylpyrrolidone, ethylene, butadiene, chloroprene, vinyl propionate, and vinyl acetate; phosphoric acid group-containing polymerizable unsaturated monomers, such as 2-acryloyloxyethyl acid phosphate, 2-methacryloyloxyethyl acid phosphate, 2-acryloyloxypropyl acid phosphate, and 2-methacryloyloxypropyl acid phosphate; carboxy-containing polymerizable unsaturated monomers, such as (meth)acrylic acid, maleic acid, crotonic acid, and β-carboxyethyl acrylate; nitrogen-containing polymerizable unsaturated monomers, such as (meth)acrylonitrile, (meth)acrylamide, methylenebis(meth)acrylamide, ethylenebis(meth)acrylamide, 2-(methacryloyloxy)ethyltrimethyl ammonium chloride, adducts of glycidyl (meth)acrylate with amines; polymerizable unsaturated monomers having at least two polymerizable unsaturated groups per molecule, such as allyl (meth)acrylate and 1,6-hexanediol di(meth)acrylate; sulfonic acid group-containing polymerizable unsaturated monomers, such as 2-acrylamide-2-methylpropanesulfonic acid, 2-sulfoethyl (meth)acrylate, allylsulfonic acid, and 4-styrenesulfonic acid; and sodium salts or ammonium salts of these sulfonic acids; acid anhydride group-containing polymerizable unsaturated monomers, such as maleic anhydride, itaconic anhydride, and citraconic anhydride; hydroxy-containing polymerizable unsaturated monomers; and the like. These monomers can be used singly, or in a combination of two or more.

Examples of the hydroxy-containing polymerizable unsaturated monomers include monoesterified products of (meth)acrylic acid with a dihydric alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate; ε-caprolactone-modified products of the monoesterified products of (meth) acrylic acid with a dihydric alcohol having 2 to 8 carbon atoms; allyl alcohol; and the like.

Hydroxy-containing polymerizable unsaturated monomers can be preferably used in view of, for example, improving water dispersibility of the acrylic urethane composite resin particles and imparting a crosslinkable functional group.

When a hydroxy-containing polymerizable unsaturated monomer is used, the amount of the hydroxy-containing polymerizable unsaturated monomer is 5 mass % or more, preferably 10 mass % or more, and more preferably within the range of 15 to 50 mass % in other polymerizable unsaturated monomer(s) (a2).

Hydrophilic Chain Component (B)

In the hydrophilic chain component (B), the carboxy-containing polymerizable unsaturated monomer (b1) is a monomer used for introducing a functional group to be reacted with the epoxy of the epoxy-containing polymerizable unsaturated monomer, which is a constituent monomer component of the hydrophobic chain component (A), to graft together the hydrophobic chain component (A) and the hydrophilic chain component (B). Further, the carboxy-containing polymerizable unsaturated monomer (b1) is also a hydrophilic group-containing polymerizable unsaturated monomer used for introducing a water-dispersible group into the graft acrylic resin (II).

Specific examples thereof include (meth)acrylic acid, maleic acid, crotonic acid, β-carboxyethyl acrylate, and the like. These can be used singly, or in a combination of two or more.

Other polymerizable unsaturated monomer(s) (b2) are polymerizable unsaturated monomers other than the monomer (b1) described above. Examples thereof include alkyl or cycloalkyl (meth)acrylates, such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, and tricyclodecanyl (meth)acrylate; isobornyl-containing polymerizable unsaturated monomers, such as isobornyl (meth)acrylate; adamantyl-containing polymerizable unsaturated monomers, such as adamanthyl (meth)acrylate; tricyclodecenyl-containing polymerizable unsaturated monomers, such as tricyclodecenyl (meth)acrylate; aromatic ring-containing polymerizable unsaturated monomers, such as benzyl (meth)acrylate, styrene, α-methylstyrene, and vinyltoluene; phosphoric acid group-containing polymerizable unsaturated monomers, such as 2-acryloyloxyethyl acid phosphate, 2-methacryloyloxyethyl acid phosphate, 2-acryloyloxypropyl acid phosphate, and 2-methacryloyloxypropyl acid phosphate; sulfonic acid group-containing polymerizable unsaturated monomers, such as 2-acrylamide-2-methylpropanesulfonic acid, 2-sulfoethyl (meth)acrylate, allylsulfonic acid, and 4-styrenesulfonic acid; and sodium salts or ammonium salts of these sulfonic acids; acid anhydride group-containing polymerizable unsaturated monomers, such as maleic anhydride, itaconic anhydride, and citraconic anhydride; polyoxyalkylene-containing (meth) acrylic monomers, such as acrylic monomers that terminally contain a hydroxy group or a $C_{1-3}$ alkyleneoxy group, and that contain a polyoxyethylene group or a polyoxypropylene group; hydrolyzable silyl-containing polymerizable unsaturated monomers, such as vinyltrimethoxysilane, vinylmethyldimethoxysilane, vinyltriethoxysilane, vinylmethyldiethoxysilane, vinyltris(2-methoxyethoxy)silane, vinyltriisopropoxysilane, γ-(meth)acryloyloxypropyltrimethoxysilane, γ-(meth)acryloyloxypropylmethyldimethoxysilane, γ-(meth)acryloyloxypropyltriethoxysilane, γ-(meth)acryloyloxypropylmethyldiethoxysilane, γ-(meth)acryloyloxypropyltri-n-propoxysilane, γ-(meth)acryloyloxypropyltriisopropoxysilane, vinyltriacetoxysilane, and β-(meth)acryloyloxyethyltrimethoxysilane; perfluoroalkyl (meth)acrylates, such as perfluorobutylethyl (meth)acrylate and perfluorooctylethyl (meth)acrylate; fluorinated alkyl-containing polymerizable unsaturated monomers, such as fluoroolefin; vinyl compounds, such as N-vinylpyrrolidone, ethylene, butadiene, chloroprene, vinyl propionate, and vinyl acetate; nitrogen-containing polymerizable unsaturated monomers, such as (meth)acrylonitrile, (meth)acrylamide, methylenebis(meth)acrylamide, ethylenebis(meth) acrylamide, 2-(methacryloyloxy)ethyltrimethyl ammonium chloride, and adducts of glycidyl (meth)acrylate with amines; polymerizable unsaturated monomers having at least two polymerizable unsaturated groups per molecule, such as allyl (meth)acrylate and 1,6-hexanediol di(meth) acrylate; hydroxy-containing polymerizable unsaturated monomers; and the like. These monomers can be used singly, or in a combination of two or more.

Among these, phosphoric acid group-containing polymerizable unsaturated monomers, sulfonic acid group-containing polymerizable unsaturated monomers, acid anhydride group-containing polymerizable unsaturated monomers, polyoxyalkylene-containing (meth)acrylic monomers, and hydroxy-containing polymerizable unsaturated monomers are hydrophilic group-containing polymerizable unsaturated monomers.

Hydroxy-containing polymerizable unsaturated monomers can also preferably be used in the hydrophilic chain component (B) in view of, for example, improving the water dispersibility of the acrylic urethane composite resin particles, and imparting a crosslinkable functional group.

Examples of hydroxy-containing polymerizable unsaturated monomers include those mentioned as examples in the above description of the unsaturated monomer(s) (a2).

When a hydroxy-containing polymerizable unsaturated monomer is used, the amount of the hydroxy-containing polymerizable unsaturated monomer is 5 mass % or more, preferably 10 mass % or more, and even more preferably within the range of 15 to 70 mass % in other polymerizable unsaturated monomer(s) (b2).

In the graft acrylic resin (II-p), the proportions of the unsaturated monomers (a1) and (a2) in the hydrophobic chain component (A) can be as follows. Generally, the proportion of the monomer (a1) is within the range of 0.1 to 10 mass %, and preferably 0.1 to 5 mass %, based on the total amount of the unsaturated monomers (a1) and (a2), and the proportion of the monomer(s) (a2) is within the range of 90 to 99.9 mass % and preferably 95 to 99.9 mass %, based on the total amount of the unsaturated monomers (a1) and (a2).

The proportions of the unsaturated monomers (b1) and (b2) in the hydrophilic chain component (B) can be as follows. Generally, the proportion of the monomer (b1) is generally within the range of 0.2 to 50 mass %, and preferably 0.2 to 40 mass %, based on the total amount of the unsaturated monomers (b1) and (b2), and the proportion of the monomer(s) (b2) is within the range of 50 to 99.8 mass %, and preferably 60 to 99.8 mass %, based on the total amount of the unsaturated monomers (b1) and (b2).

Further, in the hydrophilic chain component (B), the hydrophilic group-containing polymerizable unsaturated monomer content is 10 to 50 mass %, preferably 20 to 50 mass %, and more preferably 20 to 40 mass %, based on the total amount of the unsaturated monomers (b1) and (b2), in view of water dispersibility.

In the hydrophobic chain component (A) and the hydrophilic chain component (B), the amount of the carboxy groups contained in the hydrophilic chain component (B) is preferably adjusted to be within the range of 1 to 20 mol, and particularly preferably 2 to 10 mol, per mol of the epoxy groups contained in the hydrophobic chain component (A), in view of the dispersion stability and storage stability of the acrylic urethane composite resin particles.

Depending on, for example, the ratio of the epoxy groups in the hydrophobic chain component (A) and the carboxy groups in the hydrophilic chain component (B) and synthesis conditions, the hydrophobic chain component (A) and the hydrophilic chain component (B) may not be grafted together, and the graft acrylic resin (II-p) may contain unreacted molecules of the hydrophobic chain component (A) and hydrophilic chain component (B) that have not undergone a grafting reaction.

In the present invention, even if such molecules that have not undergone a grafting reaction are contained, a mixture containing the unreacted portion is used as the graft acrylic resin (II) and used as a dispersion stabilizer of the acrylic urethane composite resin particles.

In the graft acrylic resin (II), the hydrophobic chain component (A)/hydrophilic chain component (B) mass ratio is preferably within the range of 50/50 to 95/5, and particularly preferably 60/40 to 90/10, in view of the water dispersibility and storage stability of the acrylic urethane composite resin particles.

The polymerization method for the graft acrylic resin (II) is not particularly limited. For example, the graft acrylic resin (II) can be synthesized by, while heating in the presence of an organic solvent, adding a monomer composition constituting the hydrophobic chain component (A) dropwise to perform polymerization, and adding a monomer composition constituting the hydrophilic chain component (B) to the copolymer solution of the hydrophobic chain component (A) dropwise to perform polymerization.

The reaction temperature in the polymerization of the hydrophobic chain component (A) and the hydrophilic chain component (B) is generally within the range of about 60 to 200° C., and preferably about 70 to 160° C. The reaction time is generally about 10 hours or less, and preferably about 0.5 to 6 hours.

Examples of the polymerization initiator in the above reaction include organic peroxides, such as benzoyl peroxide, octanoyl peroxide, lauroyl peroxide, stearoyl peroxide, cumene hydroperoxide, tert-butyl peroxide, di-tert-amyl peroxide, t-butyl peroxy-2-ethylhexanoate, tert-butylperoxy laurate, tart-butylperoxy isopropyl carbonate, Cert-butylperoxy acetate, and diisopropylbenzene hydroperoxide; azo compounds, such as azobisisobutyronitrile, azobis(2,4-dimethylvaleronitrile), azobis(2-methylpropionenitrile), azobis (2-methylbutyronitrile), 4,4'-azobis(4-cyanobutanoic acid), dimethyl azobis(2-methylpropionate), azobis[2-methyl-N-(2-hydroxyethyl)-propionamide], and azobis (2-methyl-N-[2-(1-hydroxybutyl)]-propionamide); persulfates, such as potassium persulfate, ammonium persulfate, and sodium persulfate.

These polymerization initiators can be used singly, or in a combination of two or more. In the polymerization reaction for the hydrophobic chain component (A) and the hydrophilic chain component (B), there is no problem if the types or amounts of polymerization initiators are different.

The amount of the polymerization initiator is generally within the range of 0.01 to 20 mass %, particularly preferably 0.1 to 15 mass %, and further particularly preferably 0.3 to 10 mass %, based on the total amount of the polymerizable unsaturated monomers used in the step, in view of polymerization reactivity etc.

In view of the production, the synthesis of the graft acrylic resin (II) is preferably performed in the presence of an organic solvent. The organic solvent can be suitably selected in view of polymerization temperature, the dispersibility, storage stability, etc., of the acrylic urethane composite resin particles.

Preferable examples of the organic solvent include alcohol solvents, cellosolve solvents, carbitol solvents, and the like. Specific examples include alcohol solvents, such as n-butanol; cellosolve solvents, such as ethylene glycol monobutyl ether, ethylene glycol monoisopropyl ether, ethylene glycol monomethyl ether, propylene glycol monomethyl ether, propylene glycol monopropyl ether, propylene glycol mono-n-butyl ether, dipropylene glycol monomethyl ether, and dipropylene glycol mono-n-butyl ether; carbitol solvents, such as diethylene glycol monobutyl ether, diethylene glycol monoethyl ether, and diethylene glycol monoethyl ether acetate; and the like. As the organic solvent, an inert organic solvent that does not mix with water, which is not listed above, can be used as long as it does not impair the water dispersion stability of the acrylic urethane composite resin particles. Examples of such organic solvents include aromatic hydrocarbon-based solvents, such as toluene and xylene; ester-based solvents, such as ethyl acetate and butyl acetate; ketone-based solvents, such as methyl ethyl ketone and cyclohexanone; and the like.

The graft acrylic resin (II) preferably has a weight average molecular weight of 5000 or more, particularly preferably 5000 to 50000, and further particularly preferably 10000 to 30000, in view of the water dispersibility, storage stability, and production of the acrylic urethane composite resin particles.

In the present specification, the weight average molecular weight can be measured using an "HLC-8120GPC" (trade name, produced by Tosoh Corporation) gel permeation chromatography apparatus together with four columns, i.e., "TSKgel G4000HXL" (one column), "TSKgel G3000HXL" (two columns), and "TSKgel G2000HXL" (one column) (trade names, produced by Tosoh Corporation); and a differential refractometer as a detector under the following conditions: mobile phase, tetrahydrofuran; measurement temperature, 40° C.; and flow rate, 1 mL/min.

In view of, for example, the dispersibility, storage stability, and water load resistance of the acrylic urethane composite resin particles, the graft acrylic resin (II) preferably has a hydroxy value of 50 to 250 mg KOH/g, particularly preferably 100 to 200 mg KOH/g, and further particularly preferably 150 to 200 mg KOH/g, and preferably has an acid value of 10 to 100 mg KOH/g, particularly preferably 20 to 70 mg KOH/g, and further particularly preferably 25 to 50 mg KOH/g.

Additionally, from the same viewpoint, the hydrophobic chain component of the graft acrylic resin (II) preferably has an acid value of 20 mg KOH or less, particularly preferably 10 mg KOH/g or less, and further particularly preferably 5 mg KOH/g or less, and the hydrophilic chain component preferably has an acid value of 50 to 400 mg KOH/g, particularly preferably 100 to 300 mg KOH/g, and further particularly preferably 150 to 300 mg KOH/g. Furthermore, the difference in acid value between the hydrophobic chain component and the hydrophilic chain component is preferably within the range of 30 to 400, particularly preferably 50 to 300, and further particularly preferably 100 to 300.

Method for Producing Acrylic Urethane Composite Resin Particles

The acrylic urethane composite resin particles are composite resin particles in which the graft acrylic resin (II) is used as a dispersion stabilizer and in which the acrylic urethane graft resin (I) is dispersed in an aqueous medium.

The acrylic urethane composite resin particles of the present invention can be produced by, for example, a production method comprising the following step:

synthesizing the acrylic urethane graft resin (I) in the presence of the graft acrylic resin in an aqueous medium, the graft acrylic resin being a hydrophobic-chain- and hydrophilic-chain-containing resin having a weight average molecular weight of 5000 or more, the acrylic resin of the acrylic urethane graft resin (I) being synthesized using, as constituent monomer components, 0.1 to 30 mass % of a polymerizable unsaturated monomer (1) containing a group having active hydrogen atom(s) reactive with an isocyanate group and 70 to 99.9 mass % of other polymerizable unsaturated monomer(s) (2).

Although the present invention is not bound thereto, the graft acrylic resin is intended to be used as a dispersion stabilizer.

A representative method for producing the acrylic urethane composite resin particles is described below. However, the method is not limited thereto, and known methods for producing acrylic urethane composite resin particles can also be used. As specific conditions of each step, those described above can be used.

The acrylic urethane composite resin particles of the present invention are produced as follows.

1. First, a urethane prepolymer is synthesized by performing a polymerization reaction for the urethane resin component of the acrylic urethane graft resin (I) in the whole or part of the polymerizable unsaturated monomer(s) (2), excluding the polymerizable unsaturated monomer (1) containing active hydrogen atom(s) reactive with an isocyanate group, of the acrylic resin component.

The production in the polymerizable unsaturated monomer(s) (2) makes it possible to synthesize the urethane resin component without using unnecessary organic solvents. Since the polymerizable unsaturated monomer(s) (2) are present in the polymerization reaction for the urethane resin component, a means such as using a polymerization inhibitor is preferably used to prevent polymerization of the polymerizable unsaturated monomer(s), as described in the description of the urethane resin component of the acrylic urethane graft resin (I) above.

2. Next, if necessary, a blocking reaction of isocyanate groups may be performed using a blocking agent.

3. The polymerizable unsaturated monomer (1) containing active hydrogen atom(s) reactive with an isocyanate group, which is a constituent monomer component of the acrylic resin component, and the isocyanate groups of the urethane resin component are subjected to a urethanization reaction to introduce the polymerizable unsaturated groups into the urethane resin component.

Thus, the acrylic resin component and the urethane resin component are grafted together to be chemically bonded to each other via the polymerizable unsaturated monomer (1) by performing afterward a polymerization reaction for the acrylic resin component (polymerization reaction of the polymerizable unsaturated groups).

4. The graft acrylic resin (II) synthesized beforehand, which is a dispersion stabilizer, is added. The graft acrylic resin (II) is added so that the acrylic urethane graft resin (I):graft acrylic resin (II) ratio is preferably 20:80 to 95:5 (mass ratio), more preferably 40:60 to 90:10, and even more preferably 60:40 to 80:20.

5. If only part of the polymerizable unsaturated monomer(s) (2) is used in Item 1 above, the remaining polymerizable unsaturated monomer(s) (2) is further added.

6. Subsequently, a neutralizer for acid groups and a deionized water are added to obtain an aqueous dispersion.

The neutralizer is not particularly limited as long as it can neutralize acid groups. Examples of basic compounds for neutralization include organic amines, such as ammonia, diethylamine, ethylethanolamine, diethanolamine, triethanolamine, monoethanolamine, monopropanolamine, isopropanolamine, ethylaminoethylamine, hydroxyethylamine, triethylamine, tributylamine, dimethylethanolamine, and diethylenetriamine; alkali metal hydroxides, such as caustic soda and caustic potash; and the like.

Such a neutralizer is preferably used in an amount such that the pH of the aqueous dispersion of the acrylic urethane composite resin particles is ultimately about 6.0 to 9.0.

The neutralizer is generally used in an amount of 0.1 to 1.5 equivalents, and preferably 0.3 to 1.2 equivalents, relative to the acid groups, such as a carboxy group.

As a method for obtaining the aqueous dispersion, dispersion can be performed using a usual stirrer. To obtain uniform aqueous dispersion of finer particles, homomixers, homogenizers, dispersing devices, line mixers, etc., can be used.

7. A radical polymerization initiator is added to the aqueous dispersion to allow a polymerization reaction of the polymerizable unsaturated monomers to proceed. If necessary, a chain extension reaction of the urethane resin component (urethane prepolymer) may be further conducted to complete all of the reactions.

When chain extension of the urethane prepolymer is performed, a chain extender other than water may be added, if necessary, to react the urethane prepolymer with the chain extender. As the chain extender, a known chain extender having active hydrogen can be used. Specific examples of such chain extenders include diamines, such as ethylenediamine, hexamethylenediamine, cyclohexanediamine, cyclohexylmethanediamine, and isophoronediamine; hydrazine; and the like.

An aqueous dispersion of the acrylic urethane composite resin particles comprising the acrylic resin component and the urethane resin component can be obtained by performing the above steps.

In view of dispersibility and storage stability, the acrylic urethane composite resin particles generally have an average particle size of 10 to 5000 nm, preferably 10 to 1000 nm, more preferably 20 to 500 nm, and particularly preferably 50 to 300 nm.

In the present specification, the average particle size of the acrylic urethane composite resin particles refers to a value obtained by measurement at 20° C. using a submicron particle size distribution analyzer after dilution with deionized water according to a usual method. For example, a "COULTER N4" (trade name, produced by Beckman Coulter, Inc.) may be used as the submicron particle size distribution analyzer.

The solids concentration of the acrylic urethane composite resin particles in an aqueous dispersion is preferably 20 to 50 mass %, and more preferably 30 to 40 mass %. When the solids concentration is more than 50 mass %, an aqueous dispersion may be difficult to obtain because emulsification is difficult. When the solids concentration is less than 20 mass %, such a low concentration results in a high proportion of the solvent (mainly water) component; therefore, it may be difficult to use such an aqueous dispersion as, for example, a component of an aqueous coating composition.

Coating Composition

Since the acrylic urethane composite resin particles of the present invention have excellent dispersibility, storage stability, and compatibility, the acrylic urethane composite resin particles of the present invention can suitably be used for, for example, coating compositions.

A coating composition can be obtained by using the acrylic urethane composite resin particles of the present invention and a film-forming resin, and if necessary, crosslinking agent, in combination.

As the film-forming resin, a water-soluble or water-dispersible film-forming resin can be used. Examples of the type of resin include acrylic resins, polyester resins, alkyd resins, polyurethane resins, and the like. The film-forming resin preferably contains a crosslinkable functional group, such as hydroxy, carboxy, or epoxy.

Examples of the crosslinking agent include melamine resins, isocyanate compounds, blocked isocyanate compounds, carbodiimide compounds, and the like.

In the coating composition containing the acrylic urethane composite resin particles of the present invention, the amount of the acrylic urethane composite resin particles of the present invention is preferably 5 to 90 mass %, particularly preferably 10 to 70 mass %, and further particularly preferably 15 to 50 mass %, based on the total solids content of the resin component, including the film-forming resin and the crosslinking agent, in view of, for example, the performance of the obtained coating film and costs.

The coating composition may further comprise coloring pigments, extender pigments, effect pigments, etc.

Examples of the coloring pigments include titanium oxide, zinc oxide, carbon black, molybdenum red, Prussian blue, cobalt blue, azo pigments, phthalocyanine pigments, quinacridone pigments, isoindoline pigments, threne pigments, perylene pigments, and the like. Among these, titanium oxide and carbon black can be preferably used.

Examples of the extender pigments include clay, kaolin, barium sulfate, barium carbonate, calcium carbonate, talc, silica, alumina white, and the like.

If necessary, the coating composition may comprise additives, such as thickeners, curing catalysts, ultraviolet absorbers, light stabilizers, antifoaming agents, plasticizers, organic solvents, surface control agents, antisettling agents, and film formation auxiliaries.

The substrate to be coated with the coating composition of the present invention is not particularly limited. Examples of such substrates include exterior panel parts of automotive bodies such as passenger cars, tracks, motorcycles, and buses; automotive components; exterior panel parts of household electric appliances such as cellular phones and audiovisual apparatus; and the like. Among these, exterior panel parts of automotive bodies and automotive components are preferable.

The materials for such substrates are not particularly limited. Examples thereof include metallic materials such as iron, aluminum, brass, copper, tin plate, stainless steel, galvanized steel, steels plated with zinc alloy (Zn—Al, Zn—Ni, Zn—Fe, etc.); plastic materials such as polyethylene resins, polypropylene resins, acrylonitrile-butadiene-styrene (ABS) resins, polyamide resins, acrylic resins, vinylidene chloride resins, polycarbonate resins, polyurethane resins, epoxy resins, and like resins, and various types of FRP; inorganic materials such as glass, cement, and concrete; wood; textile materials such as paper and cloth; and the like. Among these, metallic materials and plastic materials are preferable.

The substrate may be an exterior panel part of an automotive body, a household electric appliance, or a metal substrate, such as a steel plate that forms such a panel or appliance, the metal surface of which has been subjected to a surface treatment, such as phosphate treatment, chromate treatment, or composite oxide treatment. The substrate may have an undercoating film and/or an intermediate coating film formed on the metallic surface.

EXAMPLES

The present invention is described in more detail below with reference to Examples and Comparative Examples. However, the present invention is not limited to these Examples. Note that "parts" and "%" are expressed on a mass basis.

Production of Graft Acrylic Resin (II)

Production Example 1

30 parts of diethylene glycol monoethyl ether acetate was placed in a reactor equipped with a thermometer, a thermostat, a stirrer, and a reflux condenser and heated to 145° C. under a nitrogen gas stream. Thereafter, the nitrogen gas stream was stopped. As a first stage (for hydrophobic chain component (A)), a mixture of 23.8 parts of n-butyl acrylate, 14 parts of n-butyl methacrylate, 7 parts of styrene, 24.5 parts of 2-hydroxyethyl methacrylate, 0.7 parts of glycidyl methacrylate, and 3.0 parts of di-t-butylperoxide, which is an initiator, was added dropwise over a period of 4 hours and then maintained at the above temperature for 30 minutes.

Further, as a second stage (for hydrophilic chain component (B)), a mixture of 9 parts of n-butyl acrylate, 12 parts of 2-hydroxyethyl methacrylate, 9 parts of acrylic acid, and 1.0 part of di-t-butylperoxide was added dropwise over a period of 30 minutes and then maintained at the above temperature. The point in time at which the graft rate was 90% or more was regarded as the endpoint, and the mixture was cooled to room temperature.

Graft rate (%)=(1−(epoxy value after completion of reaction of the second stage/epoxy value after completion of reaction of the first stage))×100

Thereafter, 51 parts of diethylene glycol monoethyl ether acetate was added, thereby obtaining a graft acrylic resin (II-1) solution having a solids content of 55%. The weight average molecular weight of the obtained graft acrylic resin (II-1) was 15000.

Production Examples 2 to 5, 7, 8, and 10

Graft acrylic resin (II-2) to (II-5), (II-7), (II-8), and (II-10) solutions were produced in the same manner as in Production Example 1, except that the formulations shown in Table 1 below were used. In the production, the amount of the initiator was adjusted to adjust the weight average molecular weight. Table 1 also shows the weight average molecular weight of each of the obtained graft acrylic resins (II).

Table 1 shows the composition ratios of the hydrophobic chain component (first stage) and the hydrophilic chain component (second stage), based on the total amount, taken as 100, of each resin component.

Each of the graft acrylic resins (II-1) to (II-5), (II-7), (II-8), and (II-10) is a graft acrylic resin (graft acrylic resin (II-p)) in which the hydrophobic chain component (A) and the hydrophilic chain component (B) are grafted together by a reaction of the epoxy groups in the hydrophobic chain component (A) with the carboxy groups in the hydrophilic chain component (B).

Production Example 6

30 parts of diethylene glycol monoethyl ether acetate was placed in a reactor equipped with a thermometer, a thermostat, a stirrer, and a reflux condenser and heated to 145° C. under a nitrogen gas stream. Thereafter, the nitrogen gas stream was stopped. As a first stage (for hydrophobic chain component (A)), a mixture of 35 parts of n-butyl acrylate, 27.3 parts of n-butyl methacrylate, 3.5 parts of styrene, 0.7 parts of 2-isocyanatoethyl methacrylate, and 3.0 parts of di-t-butylperoxide, which is an initiator, was added dropwise over a period of 4 hours and then maintained at the above temperature for 30 minutes.

Further, as a second stage (for hydrophilic chain component (B)), a mixture of 9 parts of n-butyl acrylate, 12 parts of 2-hydroxyethyl methacrylate, 9 parts of acrylic acid, and 1.0 part of di-t-butylperoxide was added dropwise over a period of 30 minutes and then maintained at the above temperature. The point in time at which the graft rate was 90% or more was regarded as the endpoint, and the mixture was cooled to room temperature.

Graft rate (%)=(1−(NCO value after completion of reaction of the second stage/NCO value after completion of reaction of the first stage))×100

Thereafter, 51 parts of diethylene glycol monoethyl ether acetate was added, thereby obtaining a graft acrylic resin (II-6) solution having a solids content of 55%. The weight average molecular weight of the obtained graft acrylic resin (II-6) was 15000.

The graft acrylic resin (II-6) is a graft acrylic resin in which the hydrophobic chain component (A) and the hydrophilic chain component (B) are grafted together by a reaction of the isocyanate groups in the hydrophobic chain component (A) with the hydroxy groups in the hydrophilic chain component (B).

Production Example 9

30 parts of diethylene glycol monoethyl ether acetate was placed in a reactor equipped with a thermometer, a thermostat, a stirrer, and a reflux condenser and heated to 145° C. under a nitrogen gas stream. Thereafter, the nitrogen gas stream was stopped. 33.5 parts of n-butyl acrylate, 14 parts of n-butyl methacrylate, 7 parts of styrene, 36.5 parts of 2-hydroxyethyl methacrylate, and 9 parts of acrylic acid, as well as 4.0 parts of di-t-butylperoxide, which is an initiator, were added dropwise over a period of 4 hours and then maintained at the above temperature for 2 hours. 51 parts of diethylene glycol monoethyl ether acetate was then added, thereby obtaining a graft acrylic resin (II-9) solution having a solids content of 55%. The weight average molecular weight of the obtained acrylic resin (II-9) was 15000 (described also in Table 1).

As is clear from the above, the acrylic resin of the Production Example 9 is an acrylic resin obtained by single-stage polymerization, not a graft acrylic resin.

The graft acrylic resins (II-9) and (II-10) are resins used for producing the acrylic urethane composite resin particles of the comparative examples (in the table, the resin (II-9) is described as graft acrylic resin for convenience; however, the graft acrylic resin (II-9) is not a graft acrylic resin, as described above).

Table 1 shows the calculated acid value and hydroxy value of each of the graft acrylic resins (II). Table 1 also shows the calculated acid value and hydroxy value of each of the hydrophobic chain component (A) and the hydrophilic chain component (B). Table 1 further shows the calculated SP value of each of the hydrophobic chain component (A) and the hydrophilic chain component (B).

TABLE 1

| | | Production Example No. | | | | | | | | | |
|---|---|---|---|---|---|---|---|---|---|---|---|
| | | 1 | 2 | 3 | 4 | 5 | 6 | 7 | 8 | 9 | 10 |
| | Graft acrylic resin (II) | II-1 | II-2 | II-3 | II-4 | II-5 | II-6 | II-7 | II-8 | II-9 | II-10 |
| Hydrophobic chain component (total: 100) | N-butyl acrylate | | | 34 | | | 50 | 19 | 44 | 33.5 | 34 |
| | N-butyl methacrylate | | | 20 | | | 39 | | 45 | 14 | 20 |
| | 2-Ethylhexyl acrylate | | | | | | | 50 | | | |
| | Styrene | | | 10 | | | 10 | 5 | 10 | 7 | 10 |
| | 2-Hydroxyethyl methacrylate | | | 35 | | | | 25 | | 36.5 | 35 |
| | glycidyl methacrylate | | | 1 | | | | | 1 | | 1 |
| | 2-Isocyanatoethyl methacrylate | | | | | | 1 | | | | |
| | Acrylic acid | | | | | | | | | 9 | |
| Acid value of hydrophobic chain component (mg KOH/g) | | | | | | 0 | | | | Copolymer obtained by single-stage polymerization | |
| Hydroxy value of hydrophobic chain component (mg KOH/g) | | | | 151 | | | 0 | 108 | 0 | | 151 |
| Solubility parameter of hydrophobic chain component | | | | 9.1 | | | 8.6 | 8.6 | 8.5 | | 9.1 |
| Percentage of hydrophobic chain component (%) | | 70 | | 90 | 50 | | 70 | | | | 70 |
| Hydrophilic chain component (total: 100) | N-butyl acrylate | | 30 | | | 20 | 30 | | 70 | | 30 |
| | N-butyl methacrylate | | | | | | | 10 | | | |
| | Ethyl acrylate | | | | | | | | | | 20 |
| | 2-Hydroxyethyl methacrylate | | 40 | | | 30 | 40 | 50 | | | 40 |
| | Acrylic acid | | | | 30 | | | 20 | 30 | | 30 |
| | Polyethylene glycol methacrylate | | | | | 20 | | | | | |
| Acid value of hydrophilic chain component (mg KOH/g) | | | | | 234 | | | 156 | 234 | | 234 |
| Hydroxy value of hydrophilic chain component (mg KOH/g) | | 173 | | | 130 | 173 | 216 | 0 | | | 173 |
| Solubility parameter of hydrophilic chain component | | | | | 10.4 | | | 10.1 | 9.9 | | 10.4 |

TABLE 1-continued

| | Production Example No. | | | | | | | | | |
|---|---|---|---|---|---|---|---|---|---|---|
| | 1 | 2 | 3 | 4 | 5 | 6 | 7 | 8 | 9 | 10 |
| Percentage of hydrophilic chain component (%) | | 30 | 10 | 50 | | 30 | | | | 30 |
| Weight average molecular weight | 15000 | 5500 | 15000 | | 20000 | | 15000 | | 15000 | 4000 |
| Acid value of graft acrylic resin (mg KOH/g) | | 70 | 23 | 117 | 70 | | 47 | 70 | 70 | |
| Hydroxy value of graft acrylic resin | | 158 | 153 | 162 | 158 | 52 | 140 | 0 | 158 | |

Production of Acrylic Urethane Composite Resin Particles

Example 1

17.2 parts of "ETERNACOLL UH-100" (trade name, produced by Ube Industries, Ltd., 1,6-hexanediol-based polycarbonate diol, molecular weight: about 1000) and 2.5 parts of dimethylol butanoic acid, both of which are starting materials of the urethane resin component, 24 parts of n-butyl acrylate and 1.5 parts of ethylene glycol dimethacrylate, both of which are polymerizable unsaturated monomers of the acrylic resin component, and 0.008 parts of butylhydroxytoluene as a polymerization inhibitor for unsaturated groups were placed in a reactor equipped with a thermometer, a thermostat, a stirrer, and a reflux condenser. After the mixture was heated to 100° C. while stirring, 10.3 parts of hydrogenated MDI (4,4'-dicyclohexylmethane diisocyanate), which is a starting material of the urethane resin component, was further added dropwise over a period of 30 minutes.

Thereafter, while the temperature was maintained at 100° C., a reaction was allowed to proceed until an NCO value of 14 mg/g or less was achieved.

The weight average molecular weight of the obtained urethane resin component was 20000.

4.5 parts of 2-hydroxyethyl acrylate, which is a polymerizable unsaturated monomer of the acrylic resin component, was further added to the reaction mixture. A reaction was allowed to proceed until an NCO value of 1 mg/g or less was achieved, and the mixture was cooled to room temperature to obtain an acrylic monomer dilute solution of an acid-group- and terminal-unsaturated-group-containing polyurethane resin.

Then, stirring was continued, and 72.7 parts of the graft acrylic resin (II-1) solution obtained in Production Example 1 and 2.0 parts of dimethylethanolamine were added, followed by neutralization. Water dispersion (phase-inversion emulsification) was carried out while suitably adding 112.9 parts of deionized water.

After completion of water dispersion (emulsification), the mixture was heated to 70° C. while stirring. A polymerization initiator solution in which 0.06 parts of "VA-057" (trade name, produced by Wako Pure Chemical Industries, Ltd., polymerization initiator, 2,2'-azobis[N-(2-carboxyethyl)-2-methylpropionamide]) was dissolved in 2.4 parts of deionized water was added dropwise over a period of 30 minutes, and the mixture was stirred for 2 hours. Thereby, a polymerization reaction of polymerizable unsaturated groups for the acrylic resin component was performed. Since heat was generated to some extent by polymerization heat during the reaction, the temperature was suitably controlled as necessary.

Thereafter, a polymerization initiator solution in which 0.03 parts of "VA-057" was dissolved in 1.2 parts of deionized water was further added as an additional catalyst, and the mixture was stirred for 2 hours while the temperature was maintained, to further allow a reaction to proceed. The mixture was then cooled to room temperature to obtain an aqueous dispersion of acrylic urethane composite resin particles No. 1.

The obtained acrylic urethane composite resin particles No. 1 have a mass solids concentration of 40% and an average particle size of 180 nm (measured with a "COULTER N4" (produced by Beckman Coulter, Inc.) submicron particle size distribution analyzer at 20° C. as diluted with deionized water).

Examples 2 to 17, and 19, and Comparative Examples 2 to 5

Aqueous dispersions of acrylic urethane composite resin particles Nos. 2 to 17, 19, and 21 to 24 were produced in the same manner as in Example 1, except that the formulations shown in Table 2 below were used. Table 2 also shows the solids concentrations of the obtained aqueous dispersions of the acrylic urethane composite resin particles and the average particle sizes of the particles.

Table 2 shows the composition ratios of the acrylic resin component and the urethane resin component, based on the total amount, taken as 100, of each resin component.

In addition, the NCO value at the reaction endpoint during the step and the amount of the polymerization initiator were suitably adjusted according to the proportions of the components.

The aqueous dispersions of acrylic urethane composite resin particles Nos. 21 to 24 are comparative examples.

Example 18

17.2 parts of "ETERNACOLL UH-100," 2.5 parts of dimethylol butanoic acid, 24 parts of n-butyl acrylate, 1.5 parts of ethylene glycol dimethacrylate, and 0.008 parts of butylhydroxytoluene were placed in a reactor equipped with a thermometer, a thermostat, a stirrer, and a reflux condenser. After the mixture was heated to 100° C. while stirring, 10.3 parts of hydrogenated MDI was added dropwise over a period of 30 minutes.

Thereafter, while the temperature was maintained at 100° C., a reaction was allowed to proceed until an NCO value of 14 mg/g or less was achieved.

The weight average molecular weight of the urethane resin component in the obtained solution was 20000.

0.5 parts of 3,5-dimethylpyrazole was added to the reaction mixture, and a reaction was allowed to proceed until an NCO value of 7 mg/g or less was achieved. Further, 4.5 parts of 2-hydroxyethyl acrylate was added, and a reaction was allowed to proceed until an NCO value of 1 mg/g or less was achieved. The mixture was cooled to room temperature to obtain an acrylic monomer dilute solution of an acid-group-, terminal-unsaturated-group-, and blocked-isocyanate-group-containing polyurethane resin.

Then, stirring was continued, and 72.7 parts of the graft acrylic resin (II-1) solution and 2.0 parts of dimethylethanolamine were added, followed by neutralization. Water dispersion (phase-inversion emulsification) was carried out while suitably adding 112.9 parts of deionized water.

After completion of water dispersion (emulsification), the mixture was heated to 70° C. while stirring. A polymerization initiator solution in which 0.06 parts of "VA-057" was dissolved in 2.4 parts of deionized water was added dropwise over a period of 30 minutes, and the mixture was stirred for 2 hours. Since heat was generated to some extent by polymerization heat during this step, the temperature was suitably controlled as necessary. Thereafter, a polymerization initiator solution in which 0.03 parts of "VA-057" was dissolved in 1.2 parts of deionized water was further added, and the mixture was stirred for 2 hours while the temperature was maintained, to further allow a reaction to proceed. The mixture was then cooled to room temperature to obtain an aqueous dispersion of acrylic urethane composite resin particles No. 18.

The obtained acrylic urethane composite resin particles No. 18 had a mass solids concentration of 40% and an average particle size of 180 nm.

Comparative Example 1

27.6 parts of "ETERNACOLL UH-100," 4.1 parts of dimethylol butanoic acid, 40 parts of n-butyl acrylate, 2.5 parts of ethylene glycol dimethacrylate, and 0.010 parts of butylhydroxytoluene were placed in a reactor equipped with a thermometer, a thermostat, a stirrer, and a reflux condenser. After the mixture was heated to 100° C. while stirring, 16.5 parts of hydrogenated MDI was added dropwise over a period of 30 minutes.

Thereafter, while the temperature was maintained at 100° C., a reaction was allowed to proceed until an NCO value of 14 mg/g or less was achieved.

The weight average molecular weight of the urethane resin component in the obtained solution was 20000.

7.5 parts of 2-hydroxyethyl acrylate was added to the reaction mixture. A reaction was allowed to proceed until an NCO value of 1 mg/g or less was achieved, and the mixture was cooled to room temperature to obtain an acrylic monomer dilute solution of an acid-group- and terminal-unsaturated-group-containing polyurethane resin.

Then, stirring was continued, and 2.0 parts of dimethylethanolamine and 32.8 parts of diethylene glycol monoethyl ether acetate were added, followed by neutralization. Water dispersion (phase-inversion emulsification) was carried out while suitably adding 112.9 parts of deionized water.

After completion of water dispersion (emulsification), the mixture was heated to 70° C. while stirring. A polymerization initiator solution in which 0.10 parts of "VA-057" was dissolved in 2.4 parts of deionized water was added dropwise over a period of 30 minutes, and the mixture was stirred for 2 hours. Since heat was generated to some extent by polymerization heat during this step, the temperature was suitably controlled as necessary. Thereafter, a polymerization initiator solution in which 0.05 parts of "VA-057" was dissolved in 1.2 parts of deionized water was further added, and the mixture was stirred for 2 hours while the temperature was maintained, to further allow a reaction to proceed. The mixture was then cooled to room temperature to obtain an aqueous dispersion of acrylic urethane composite resin particles No. 20.

The obtained acrylic urethane composite resin particles No. 20 had a mass solids concentration of 40% and an average particle size of 100 nm.

Evaluation Tests

The following evaluation tests were performed for the acrylic urethane composite resin particles Nos. 1 to 24 obtained in Examples 1 to 19 and Comparative Examples 1 to 5. Table 2 shows the evaluation results.

Test Methods

Polymerization stability: Aggregate at the time of polymerization in each of the aqueous dispersions of the acrylic urethane composite resin particles was collected by filtration using a 100-mesh nylon screen, dried in a drying oven at 100° C. for 3 hours, weighed, and evaluated according to the following criteria.

S: The amount of aggregate in the dry state is less than 100 ppm.

A: The amount of aggregate in the dry state is 100 ppm or more, but less than 1000 ppm.

A': The amount of aggregate in the dry state is 1000 ppm or more, but less than 2000 ppm.

C: The amount of aggregate in the dry state is 2000 ppm or more, but polymerization is possible.

D: Polymerization is impossible because of instability.

Mechanical stability: 100 g of each of the aqueous dispersions of the acrylic urethane composite resin particles was tested under a certain shear for 15 minutes using a Maron tester; each dispersion was filtered with a 100-mesh nylon screen, and the amount of residue was measured and evaluated according to the following criteria.

S: In a test at 15-kg load, the amount of residue is less than 0.01 g, or almost no residue is observed.

A: In a test at 10-kg load, the amount of residue is less than 0.01 g, or almost no residue is observed.

B: In a test at 10-kg load, the amount of residue is 0.01 g or more, but less than 0.1 g.

C: The amount of residue is 0.1 g or more, or gelation occurs during the test.

Storage stability: 200 g of each of the aqueous dispersions of the acrylic urethane composite resin particles was individually placed in sealable glass bottles, and placed in a constant-temperature water bath at 40° C.

Thereafter, the aqueous dispersions were taken out monthly to confirm the presence or absence of coagulation and the viscosity, and a record was made when there was coagulation or when the change in the viscosity was ±30% or more.

In the evaluation data of Table 2, the time from the start of the test to the above-described deterioration state is expressed on a monthly basis. For example, "3M" indicates three months after the start of the test; and "6M<" indicates that the dispersion is not in the deterioration state even six months after the start of the test, and has excellent storage stability.

Compatibility test: Each of the aqueous dispersions of the acrylic urethane composite resin particles was mixed with an acrylic emulsion, a polyester dispersion, a urethane dispersion, or a melamine resin at a solids ratio of 1:1, and a film formation auxiliary was added, if necessary. Each mixture was individually applied to glass plates with an applicator to a film thickness of 30 μm when dried, dried at room temperature for 1 week, and then evaluated according to the following criteria.

S: A transparent coating film that is not cloudy is obtained. No domains are observed in phase contrast microscopic observation.

A: A transparent coating film that is not cloudy is obtained. Some domains are observed in phase-contrast microscopic observation.
B: A coating film that is slightly cloudy is obtained.
C: Completely separated, and very incompatible The following acrylic emulsion, polyester dispersion, urethane dispersion, and melamine resin were used.
Acrylic emulsion: Burnock, produced by DIC Corporation, solids content: 45%, WE-301
Polyester dispersion: Watersol produced by DIC Corporation, solids content: 42%, BCD-3090
Urethane dispersion: U-Coat UX-300 (produced by Sanyo Chemical Industries, Ltd., polycarbonate-based urethane emulsion)
Melamine resin: Methyl-butyl mixed etherified melamine resin, solids content: 80%, weight average molecular weight: 800

Washability

Aqueous metallic coating compositions containing, as main components, an aluminum pigment and a resin component containing the acrylic emulsion, the melamine resin, and, individually, each acrylic urethane composite resin emulsion used in the above-described compatibility test at a solids ratio of 1:1:1 were adjusted to a coating viscosity, and each aqueous metallic coating composition was evaluated for washability from a bell.

Each aqueous metallic coating composition was ejected for 10 seconds using a "G1 Copes Bell" automatic coater produced by ABB (rotation speed: 30,000/min, shaping air pressure: 4.0 kg/cm$^2$, paint flow rate: 200 cc/min), and allowed to stand for 50 seconds. This procedure was repeated 10 times, and cleaning water (water/ethylene glycol butyl ether/isopropanol/dimethylethanolamine=90/5/4/1 (mass ratio)) was ejected for 2 seconds. The condition of the coating composition remaining on the groove of the bell was evaluated.
A: No coating composition remained on the groove of the bell.
B: A small amount of the coating composition remained on the groove of the bell.
C: A considerable amount of the coating composition remained on the groove of the bell.

TABLE 2

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| | Acrylic urethane composite resin particles No. | | 1 | 2 | 3 | 4 | 5 | 6 | 7 | 8 | 9 | 10 |
| | Acrylic urethane graft resin (I) | | | | | | I-1 | | | | I-2 | I-3 |
| Urethane resin component (Total: 100) | OH component | ETERNACOLL UH-100 | | | | | | 57.3 | | | | |
| | | 1,6-Hexanediol | | | | | | | | | | |
| | | Dimethylol butanoic acid | | | | | | 8.5 | | | | |
| | NCO component | Hydrogenated MDI | | | | | | 34.3 | | | | |
| | | Isophorone diisocyanate | | | | | | | | | | |
| | Block component | 3,5-Dimethylpyrazole | | | | | | | | | | |
| | Weight average molecular weight of urethane resin component | | | | | | | 20000 | | | | |
| | Percentage of urethane resin component (%) | | 30 | 40 | | | | | 30 | | | |
| Acrylic resin component (total: 100) | Polymerizable unsaturated monomer (2) | n-Butyl acrylate | | | | | 80 | | | | 94.9 | 67 |
| | | 2-Ethylhexyl acrylate | | | | | | | | | | |
| | | Ethyl acrylate | | | | | | | | | | |
| | | Styrene | | | | | | | | | | |
| | | Ethylene glycol dimethacrylate | | | | | | 5 | | | | |
| | Active-hydrogen-containing polymerizable unsaturated monomer (1) | 2-Hydroxyethyl acrylate | | | | | 15 | | | | 0.1 | 28 |
| | | Aminopropyl methacrylate | | | | | | | | | | |
| | Percentage of acrylic resin component (%) | | 30 | 40 | | | | | 30 | | | |
| Percentage of acrylic urethane graft resin (I) (solids content) (%) | | | 60 | 80 | | | | | 60 | | | |
| Graft acrylic resin (II) | | | II-1 | | II-2 | II-3 | II-4 | II-5 | II-6 | II-7 | | II-1 |
| Percentage of graft acrylic resin (II) (solids content) (%) | | | 40 | 20 | | | | | 40 | | | |
| Average particle size of acrylic urethane composite resin particles (nm) | | | 180 | 160 | 150 | 220 | 120 | 140 | 180 | 170 | 180 | 170 |
| Solids concentration of acrylic urethane composite resin particles (%) | | | | | | | | 40 | | | | |
| Polymerization stability | | | S | A | A | A | S | S | A | S | S | A |
| Mechanical stability | | | S | A | A | A | S | S | S | S | A | A |
| Storage stability | | | 6M< | 6M< | 5M | 6M< | 6M< | 6M< | 6M< | 6M< | 6M< | 5M |
| Compatibility | | Acryl | S | A | A | S | S | S | S | S | S | A |
| | | Polyester | S | S | S | S | S | S | S | S | S | A |
| | | Urethane | S | S | A | A | S | S | S | S | A | S |
| | | Melamine | S | A | A | S | S | S | S | S | S | S |
| Washability | | | A | A | A | A | A | A | A | A | A | A |

| | | | Example | | | | | | | | |
|---|---|---|---|---|---|---|---|---|---|---|---|
| | | | 11 | 12 | 13 | 14 | 15 | 16 | 17 | 18 | 19 |
| | Acrylic urethane composite resin particles No. | | 11 | 12 | 13 | 14 | 15 | 16 | 17 | 18 | 19 |
| | Acrylic urethane graft resin (I) | | I-4 | I-5 | I-6 | I-7 | I-8 | I-9 | I-10 | I-11 | I-12 |
| Urethane resin component (Total: 100) | OH component | ETERNACOLL UH-100 | | | 57.3 | | | 60.0 | 56.2 | 55.7 | 54.0 |
| | | 1,6-Hexanediol | | | | | | | | | 4.0 |
| | | Dimethylol butanoic acid | | | | | 8.5 | | | | 8.0 |
| | NCO component | Hydrogenated MDI | | | 34.3 | | | 31.5 | 35.3 | 34.2 | |
| | | Isophorone diisocyanate | | | | | | | | | 34.0 |
| | Block component | 3,5-Dimethylpyrazole | | | | | | | | | 1.6 |
| | Weight average molecular weight of urethane resin component | | | | 20000 | | | 50000 | 10000 | 20000 | |
| | Percentage of urethane resin component (%) | | | | | | 30 | | | | |

TABLE 2-continued

| Acrylic resin component (total: 100) | Polymerizable unsaturated monomer (2) | n-Butyl acrylate | 80 | 12 | 13 | 85 | 75 | | 80 | | |
| --- | --- | --- | --- | --- | --- | --- | --- | --- | --- | --- | --- |
| | | 2-Ethylhexyl acrylate | | 80 | | | | | | | |
| | | Ethyl acrylate | | | 70 | | | | | | |
| | | Styrene | | | 10 | | | | | | |
| | | Ethylene glycol dimethacrylate | | 5 | | 0 | 10 | | 5 | | |
| | Active-hydrogen-containing polymerizable unsaturated monomer (1) | 2-Hydroxyethyl acrylate | | | | | | 15 | | | |
| | | Aminopropyl methacrylate | 15 | | | | | | | | |
| Percentage of acrylic resin component (%) | | | | | | | | 30 | | | |
| Percentage of acrylic urethane graft resin (I) (solids content) (%) | | | | | | | | 60 | | | |
| Graft acrylic resin (II) | | | | | | | | II-1 | | | |
| Percentage of graft acrylic resin (II) (solids content) (%) | | | | | | | | 40 | | | |
| Average particle size of acrylic urethane composite resin particles (nm) | | | 160 | 180 | 200 | 190 | 170 | 190 | 150 | 180 | 190 |
| Solids concentration of acrylic urethane composite resin particles (%) | | | | | | | | 40 | | | |
| Polymerization stability | | | A | S | A | S | A | S | A | S | S |
| Mechanical stability | | | S | S | S | A | A | S | A | S | S |
| Storage stability | | | 6M< | 684< | 6M< | 6M< | 6M< | 6M< | 6M< | 6M< | 6M< |
| Compatibility | | Acryl | S | S | S | S | S | A | S | S | A |
| | | Polyester | S | S | S | S | S | S | S | S | S |
| | | Urethane | S | S | S | S | A | S | S | S | S |
| | | Melamine | A | S | S | S | A | A | S | S | A |
| Washability | | | A | A | A | A | A | A | A | A | A |

| | | | Comparative Example | | | | |
| --- | --- | --- | --- | --- | --- | --- | --- |
| | | | 1 | 2 | 3 | 4 | 5 |
| Acrylic urethane composite resin particles No. | | | 20 | 21 | 22 | 23 | 24 |
| Acrylic urethane graft resin (I) | | | | I-1 | | I-13 | I-14 |
| Urethane resin component (Total: 100) | OH component | ETERNACOLL UH-100 | | | 57.3 | | |
| | | 1,6-Hexanediol | | | | | |
| | | Dimethylol butanoic acid | | | 8.5 | | |
| | NCO component | Hydrogenated MDI | | | 34.3 | | |
| | | Isophorone diisocyanate | | | | | |
| | Block component | 3,5-Dimethylpyrazole | | | | | |
| Weight average molecular weight of urethane resin component | | | | | 20000 | | |
| Percentage of urethane resin component (%) | | | 50 | | 30 | | |
| Acrylic resin component (total: 100) | Polymerizable unsaturated monomer (2) | n-Butyl acrylate | | 80 | | 94.95 | 60 |
| | | 2-Ethylhexyl acrylate | | | | | |
| | | Ethyl acrylate | | | | | |
| | | Styrene | | | | | |
| | | Ethylene glycol dimethacrylate | | | 5 | | |
| | Active-hydrogen-containing polymerizable unsaturated monomer (1) | 2-Hydroxyethyl acrylate | | 15 | | 0.05 | 35 |
| | | Aminopropyl methacrylate | | | | | |
| Percentage of acrylic resin component (%) | | | 50 | | 30 | | |
| Percentage of acrylic urethane graft resin (I) (solids content) (%) | | | 100 | | 60 | | |
| Graft acrylic resin (II) | | | Not contained | II-9 | II-10 | | II-1 |
| Percentage of graft acrylic resin (II) (solids content) (%) | | | 0 | | | 40 | |
| Average particle size of acrylic urethane composite resin particles (nm) | | | 100 | 250 | — | 190 | 200 |
| Solids concentration of acrylic urethane composite resin particles (%) | | | | | 40 | | |
| Polymerization stability | | | A' | B | C | S | B |
| Mechanical stability | | | A | B | — | A | A |
| Storage stability | | | 2M | 3M | — | 3M | 3M |
| Compatibility | | Acryl | C | A | — | B | A |
| | | Polyester | B | S | — | A | A |
| | | Urethane | A | A | — | B | A |
| | | Melamine | C | A | — | B | A |
| Washability | | | C | B | — | A | B |

The invention claimed is:

1. Acrylic urethane composite resin particles described below:
   the acrylic urethane composite resin particles comprising an acrylic urethane graft resin (I) and a graft acrylic resin (II),
   the acrylic urethane graft resin (I) being synthesized in the presence of the graft acrylic resin (II), the graft acrylic resin (II) being a hydrophobic-chain- and hydrophilic-chain-containing resin having a weight average molecular weight of 5000 or more,
   the acrylic urethane graft resin (I) comprising an acrylic resin component and a urethane resin component,
   the acrylic resin portion of the acrylic urethane graft resin (I) being synthesized using, as constituent monomer components, 0.1 to 30 mass % of a polymerizable unsaturated monomer (1) containing a group having active hydrogen atom(s) reactive with an isocyanate group and 70 to 99.9 mass % of other polymerizable unsaturated monomer(s) (2), and
   the graft acrylic resin (II) having a structure in which a hydrophobic chain component (A) and a hydrophilic chain component (B) are grafted together and the difference in solubility parameter between the hydrophobic chain component (A) and hydrophilic chain component (B) is at least 0.5.

2. A coating composition comprising the acrylic urethane composite resin particles according to claim 1.

3. The coating composition according to claim 2, which comprises a film-forming resin component.

4. A method for producing acrylic urethane composite resin particles comprising an acrylic urethane graft resin (I) and a graft acrylic resin (II), the method comprising the following step:
   synthesizing the acrylic urethane graft resin (I) in the presence of the graft acrylic resin (II) in an aqueous medium, the graft acrylic resin (II) being a hydrophobic-chain- and hydrophilic-chain-containing resin having a weight average molecular weight of 5000 or more,
   the acrylic urethane graft resin (I) comprising an acrylic resin component and a urethane resin component,
   the acrylic resin portion of the acrylic urethane graft resin (I) being synthesized using, as constituent monomer components, 0.1 to 30 mass % of a polymerizable unsaturated monomer (1) containing a group having active hydrogen atom(s) reactive with an isocyanate group and 70 to 99.9 mass % of other polymerizable unsaturated monomer(s) (2),
   wherein the graft acrylic resin (II) has a structure in which a hydrophobic chain component (A) and a hydrophilic chain component (B) are grafted together and the difference in solubility parameter between the hydrophobic chain component (A) and hydrophilic chain component (B) is at least 0.5.

5. The acrylic urethane composite resin particles according to claim 1, wherein the graft acrylic resin (II) has a structure in which a hydrophobic chain component (A) and a hydrophilic chain component (B) are grafted together, and an epoxy-containing polymerizable unsaturated monomer is incorporated into the hydrophobic chain component (A) and a carboxy-containing polymerizable unsaturated monomer is incorporated into the hydrophilic chain component (B).

6. The acrylic urethane composite resin particles according to claim 1, wherein the acrylic urethane composite resin particles are dispersed in water as micelles having a core shell structure in which the graft acrylic resin (II) is present outside and the acrylic urethane graft resin (I) is present inside.

* * * * *